US010826156B2

(12) United States Patent
Dominguez

(10) Patent No.: US 10,826,156 B2
(45) Date of Patent: Nov. 3, 2020

(54) PORTABLE CELLULAR TOWER ANTENNA BALLAST SYSTEM

(71) Applicant: Eddy Dominguez, Fremont, CA (US)

(72) Inventor: Eddy Dominguez, Fremont, CA (US)

(73) Assignee: Maverick Technologies, Inc., Fremont, CA (US)

( * ) Notice: Subject to any disclaimer, the term of this patent is extended or adjusted under 35 U.S.C. 154(b) by 321 days.

(21) Appl. No.: 15/984,252

(22) Filed: May 18, 2018

(65) Prior Publication Data
US 2019/0356035 A1    Nov. 21, 2019

(51) Int. Cl.
*H01Q 1/12* (2006.01)
*E04H 12/18* (2006.01)

(52) U.S. Cl.
CPC ......... *H01Q 1/1235* (2013.01); *E04H 12/182* (2013.01)

(58) Field of Classification Search
CPC ...... H01Q 1/1235; H01Q 21/205; H01Q 1/08; H01Q 1/246; E04H 12/182; E04H 2005/005; E04H 5/02; E04H 12/2238; E04H 12/20
See application file for complete search history.

(56) References Cited

U.S. PATENT DOCUMENTS

| 10,301,813 B1 * | 5/2019 | Hawkins ............. E04B 1/34815 |
| 2008/0193246 A1 * | 8/2008 | Bohman ................. B60P 7/132 |
| | | 410/82 |
| 2012/0006369 A1 * | 1/2012 | Cantin .................. E04B 1/3444 |
| | | 135/96 |
| 2015/0144758 A1 * | 5/2015 | Kolokotronis ......... H01Q 3/005 |
| | | 248/282.1 |
| 2018/0062239 A1 * | 3/2018 | McCoy ................ H01Q 1/1235 |

* cited by examiner

Primary Examiner — Dameon E Levi
Assistant Examiner — David E Lotter
(74) Attorney, Agent, or Firm — Patent Law Office, PC; Bao Tran

(57) ABSTRACT

A ballast system includes a frame having first and second sides, each having first and second openings to accept first and second outriggers extending therefrom and third and fourth openings to secure to an antenna tower base or one or more supplemental outriggers.

20 Claims, 32 Drawing Sheets

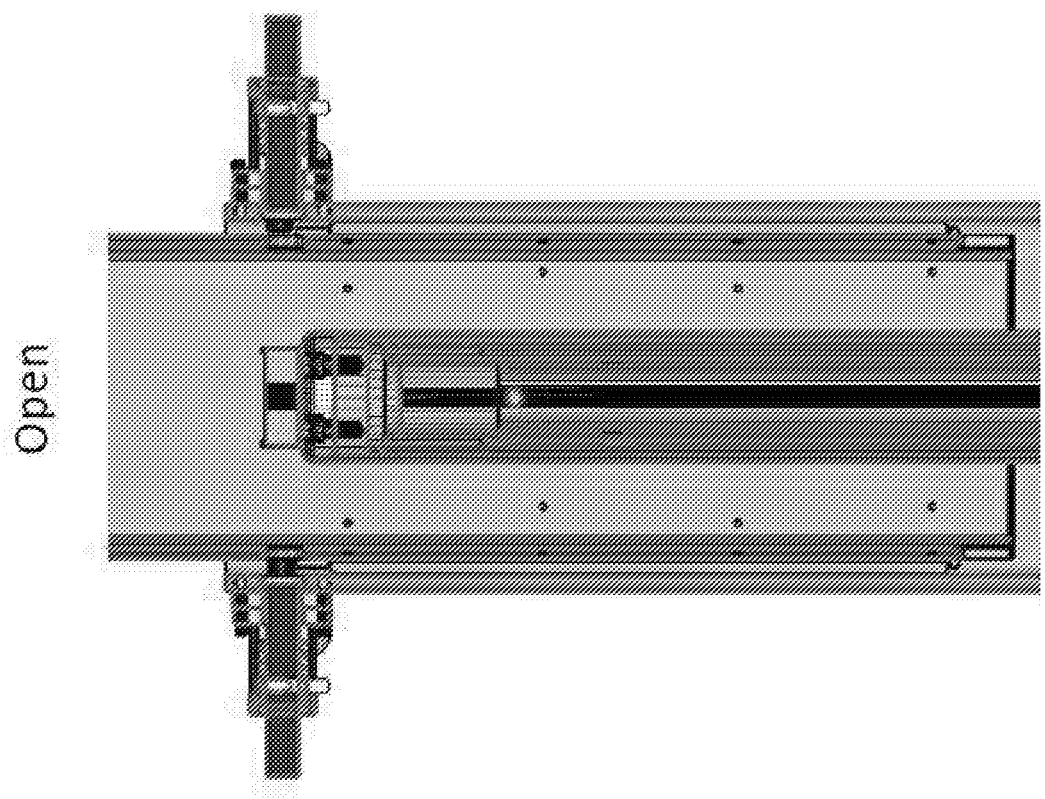
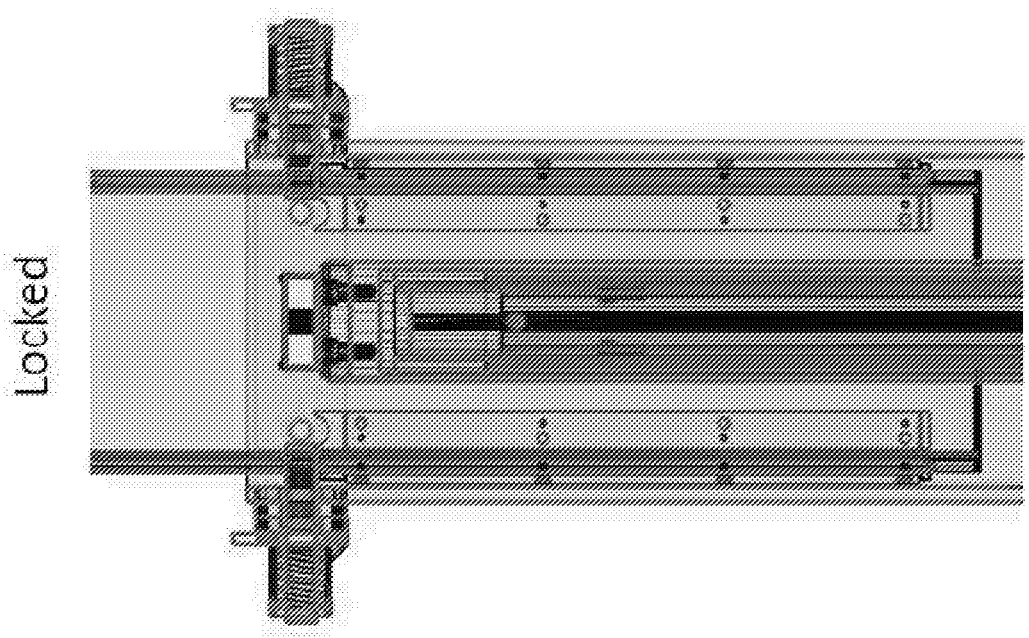
FIG. 14B

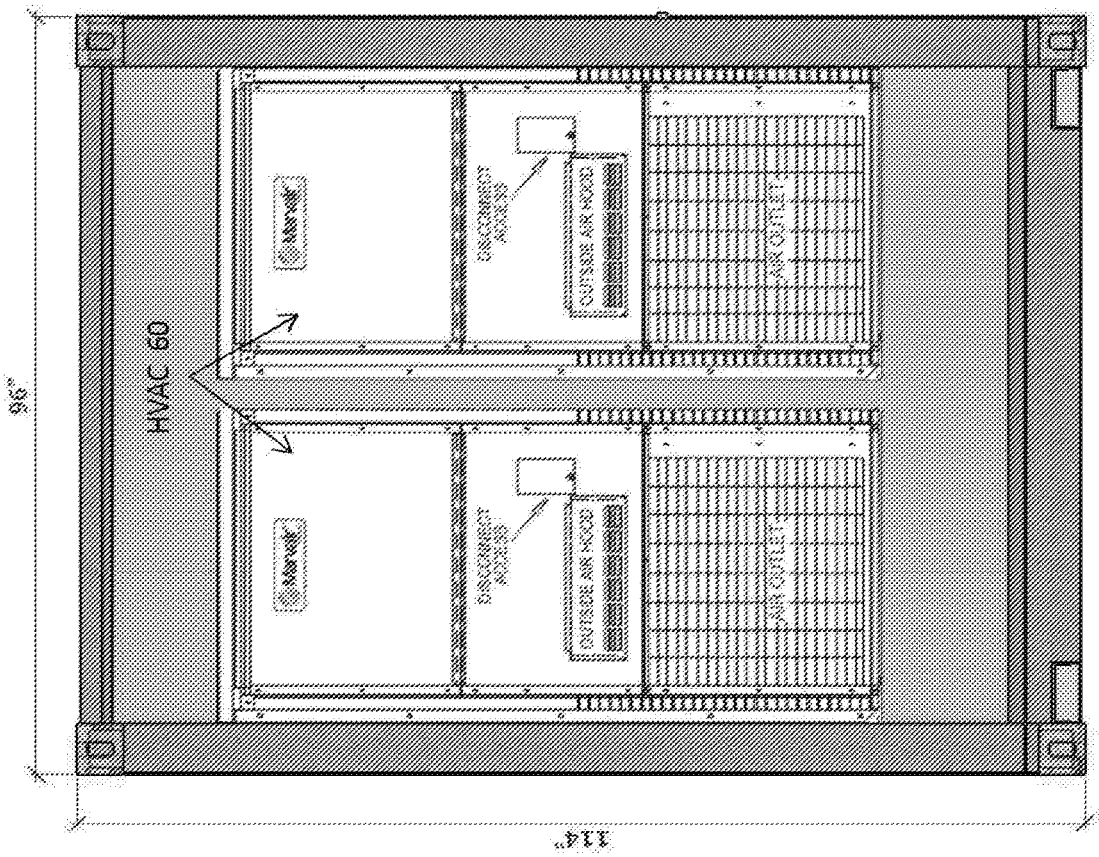
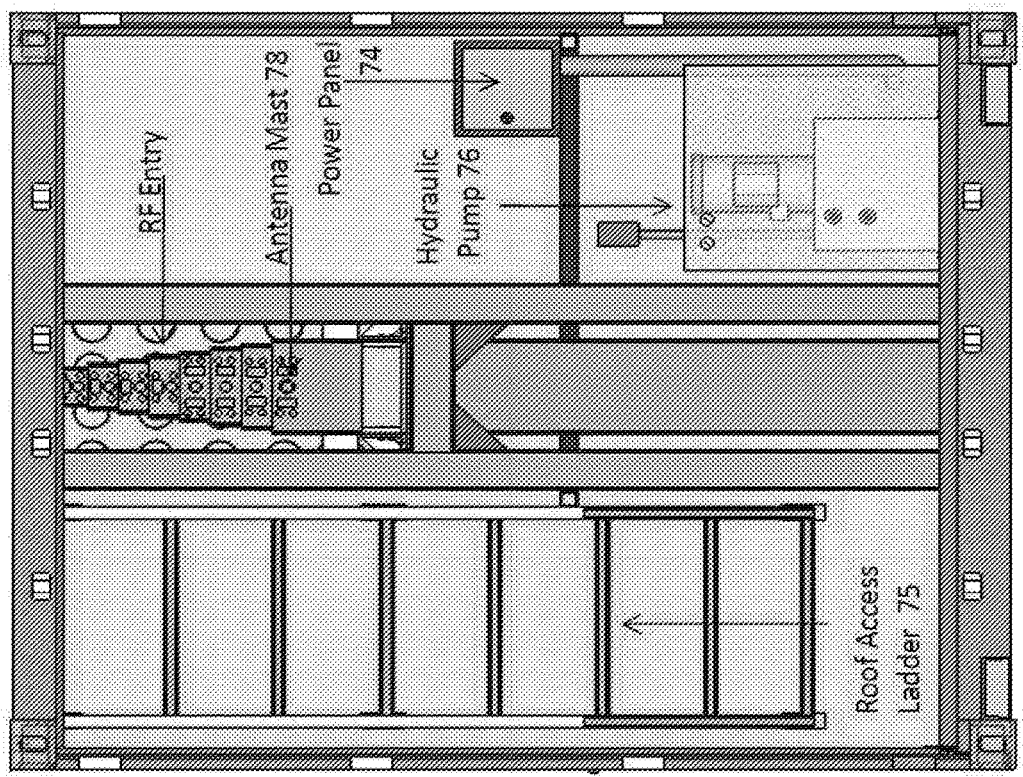
FIG. 16

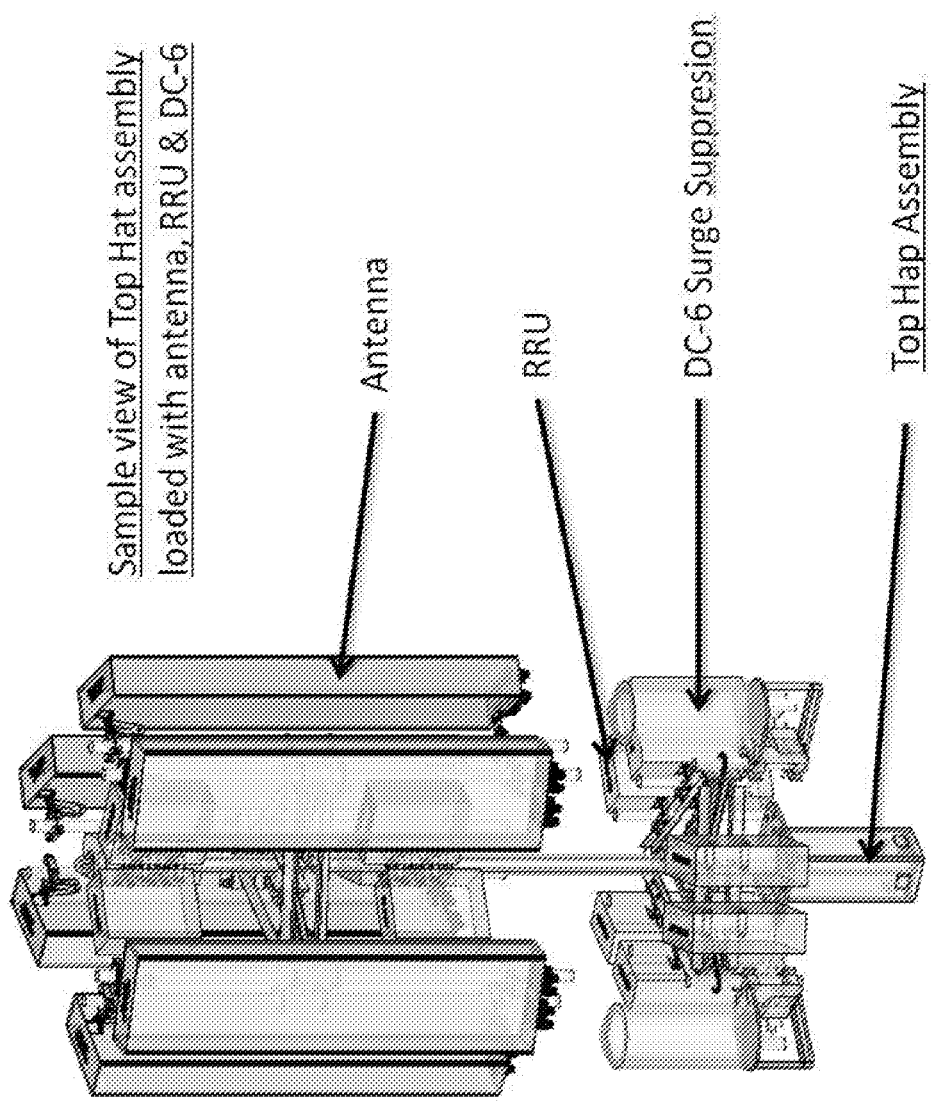
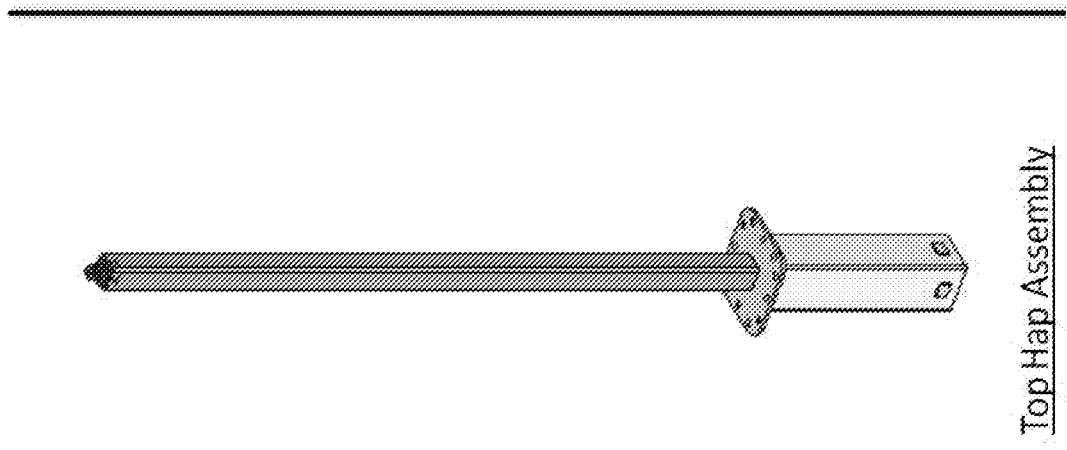
FIG. 28

PORTABLE CELLULAR TOWER ANTENNA BALLAST SYSTEM

FIELD OF THE INVENTION

This invention relates to a telescopic antenna ballast.

BACKGROUND OF THE INVENTION

The popularity of smart phones has driven the demand for cell towers to service the cell phones. Cell tower costs vary widely, depending on what kinds of deals the constructor has with various vendors. Generally, constructing a tower costs around $200,000 or $250,000. About $150,000 of that is for "civil installation" which includes pouring concrete, the mast and its erection, backup generators, fencing, tiny air-conditioned shack, and security systems. A major issue is the permit issuance, which can take 12-36 months to obtain.

To provide fast installation, portable cell towers have emerged. The cell tower typically includes a ballast that supports a tall antenna mast. Ideally, the antenna should be as high as possible to optimum signal transmission or reception. The ballast is used to anchor the tall antenna mast to the ground.

SUMMARY OF THE INVENTION

In one aspect, a ballast system includes a frame having first and second sides, each having first and second openings to accept first and second outriggers extending therefrom and third and fourth openings to secure to an antenna tower base or one or more supplemental outriggers.

In another aspect, a ballast system includes an antenna support frame including a centrally positioned mast mount; an upper portion with a recess to receive cables and a first support beam; a lower portion with a recess to receive cables and a second support beam; an upper concrete slab coupled to the upper portion; and a lower concrete slab coupled to the lower portion; and a plurality of support frames coupled to the antenna support frame, including: an upper portion with a recess to receive cables and the first support beam; a lower portion with a recess to receive cables and the second support beam; an upper concrete slab coupled to the upper portion; and a lower concrete slab coupled to the lower portion.

In another aspect, antenna system includes a base section; a plurality of movable antenna sections adapted to fit inside of the base section, each movable antenna section including an outside section and an inside section, wherein the outside section has a plurality of threaded section locks penetrating through threads on the inside and outside sections to extend at least 0.5 inch beyond the inside section to prevent the inside section from collapsing into the outside section in an extended mode; and a lock pin centrally positioned between the section locks to receive an actuator to extend the antenna section.

In a further aspect, a cellular communication system includes a modular shelter having pre-configured equipment to communicate with a telecommunication facility, wherein the shelter has the approximate dimensions of a standard International Organization for Standardization (ISO) freight container; a door to enter the shelter; a computer rack to receive computer equipment; a radio unit rack to receive wireless communication equipment; air conditioning machine to cool the shelter interior; and an antenna system having a base section; a plurality of movable antenna sections adapted to fit inside of the base section, each movable antenna section including an outside section and an inside section, wherein the outside section has a plurality of threaded section locks penetrating through threads on the inside and outside sections to extend at least 0.5 inch beyond the inside section to prevent the inside section from collapsing into the outside section in an extended mode; and a lock pin centrally positioned between the section locks to receive an actuator to extend the antenna section.

Implementations of the above system can include one or more of the following. The frame is a metal structure with an upper frame that is substantially square or rectangular shaped and provides a recess to receive the support beam, and the recess is adequate to receive electrical/optical cables runway on one or more sides of the recess. Similarly, the frame 200 has a lower frame that is substantially square shaped and provides a recess to receive the support beam 230, and the recess is adequate to receive electrical/optical cables runway on one or more sides of the recess. The upper and lower frames are secured together using bolts to secure the frames together. The upper and lower frames are also interconnected using the corner posts. The ballast frame is attached to two concrete slabs 240, one on top and one on bottom, to provide ballast weight. The frames are interconnected to each other using a tongue and groove block module attachment. The antenna mast can have the following. An elastic sheet can be positioned between the inside and outside section. The inside section can have one or more bolts extending through the inside section and contacting the outside section. The system can have a first section extending the antenna system to a height of 87-⅜", a second section extending the antenna system to a height of 164", a third section extending the antenna system to a height of 244-⅝", a fourth section extending the antenna system to a height of 317-¾", a fifth section extending the antenna system to a height of 415". a sixth section extending the antenna system to a height of 505-½", a seventh section extending the antenna system to a height of 599-¾", an eighth section extending the antenna system to a height of 697-½", and a ninth section extending the antenna system to a height of 716-¾" in height. The antenna sections can collapse to a minimum height of 112-½". The twist lock is spring loaded. One or more bolts to secure the twist lock to the outside section. An actuator can elevate an antenna mast. A plurality of radio frequency entry openings can receive cables to an antenna. A ballast can secure the base section. An elastic sheet can be positioned between the inside and outside section. The inside section can have one or more bolts extending through the inside section and contacting the outside section. The system can have a first section extending the antenna system to a height of 87-⅜", a second section extending the antenna system to a height of 164", a third section extending the antenna system to a height of 244-⅝", a fourth section extending the antenna system to a height of 317-¾", a fifth section extending the antenna system to a height of 415". a sixth section extending the antenna system to a height of 505-½", a seventh section extending the antenna system to a height of 599-¾", an eighth section extending the antenna system to a height of 697-½", and a ninth section extending the antenna system to a height of 716-¾" in height. The antenna sections can collapse to a minimum height of 112-½". The twist lock is spring loaded. One or more bolts to secure the twist lock to the outside section. An actuator can elevate an antenna mast. A plurality of radio frequency entry openings can receive cables to an antenna. A ballast can secure the base section.

Advantages of the system may include one or more of the following. The mast increases the height of the antenna to overcome obstructions in the environment. Obstructions may include vegetation, vine canopies, tree canopies, bridges, traffic signals, buildings or otherwise. The increased height of the antenna increases the range of effective communications between communication electronics and a communications device located remotely apart from the base station. The system maximizes available antenna height of an antenna mast mounted on a vehicle or a fixed base to improve the range and reliability of communications. The advantages of the present invention can be achieved in an economical, practical, and facile manner.

BRIEF DESCRIPTION OF THE DRAWINGS

The invention can be more fully understood by reading the subsequent detailed description and examples with references made to the accompanying drawings, wherein:

FIG. 8 shows a single carrier version with one shelter and the antenna mast, while FIG. 9 shows a two carrier version with two shelters and the antenna in between.

FIG. 14A shows a bolt lock system in unlocked and locked states, while FIG. 14B shows a twist lock system in unlocked and locked states, respectively.

FIG. 16 shows an exemplary mast side and HVAC side view of the pod of FIG. 15A.

FIGS. 25-28 show more details on an exemplary antenna mast and antenna mount system.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
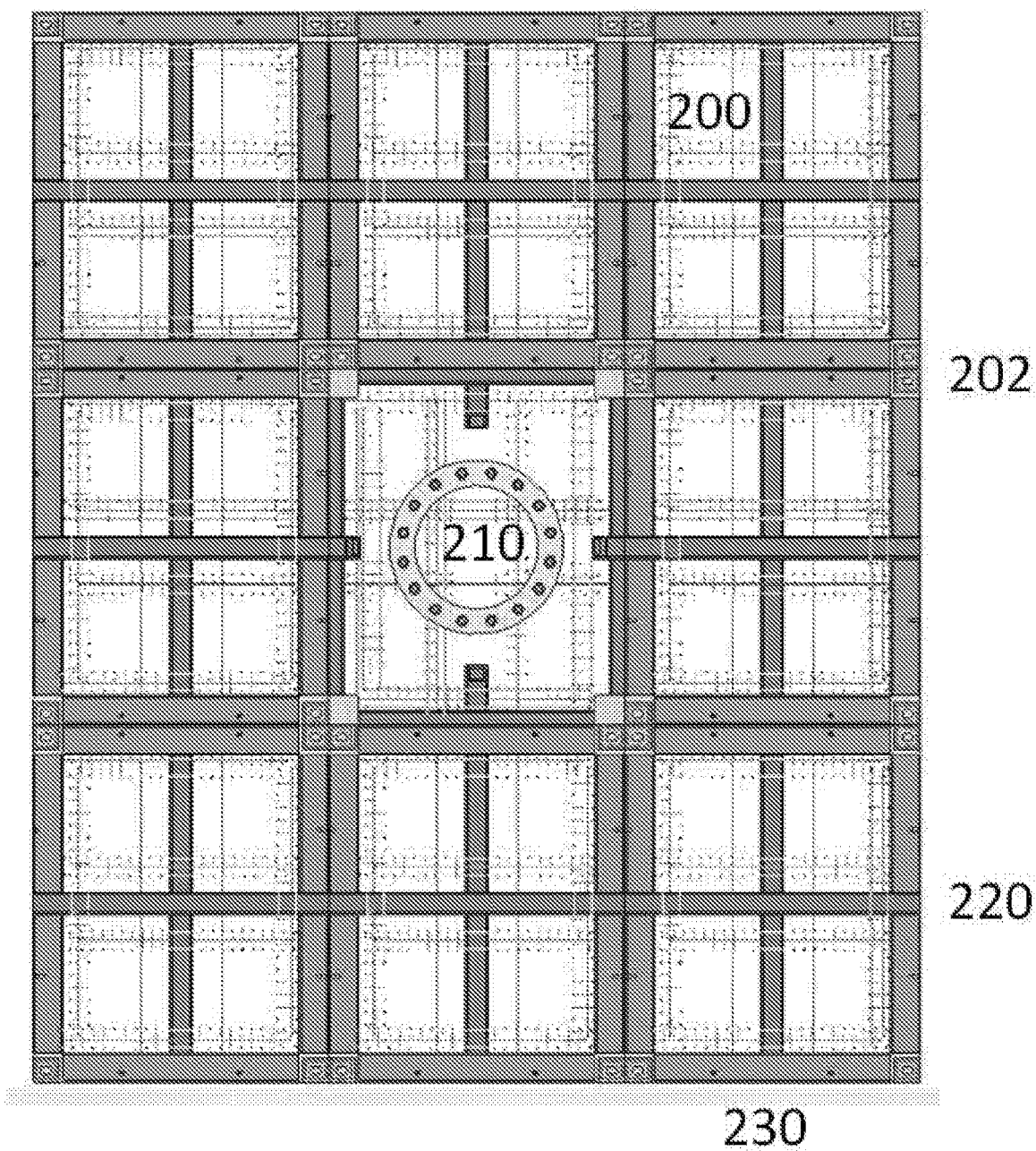
FIG. 1 shows a frame view of an exemplary tower ballast set.

FIG. 1 shows a frame view of an exemplary tower ballast set. The ballast set includes a plurality of ballast support frames 200 surrounding a mast support frame 210. To provide rigidity and ballast strength, the support frames 200 are cross-linked horizontally with support beams 220 and vertically with support beams 230. Corner posts 202 are provided at each corner of the telco shelter. These posts are load-bearing, and are reinforced to permit stacking of a telco shelter and antenna mast on the ballast. The corner posts may be provided with jacks that may pivot outwardly from the post. The telco shelter may have the configuration of a standard ISO container.

Figure 2:
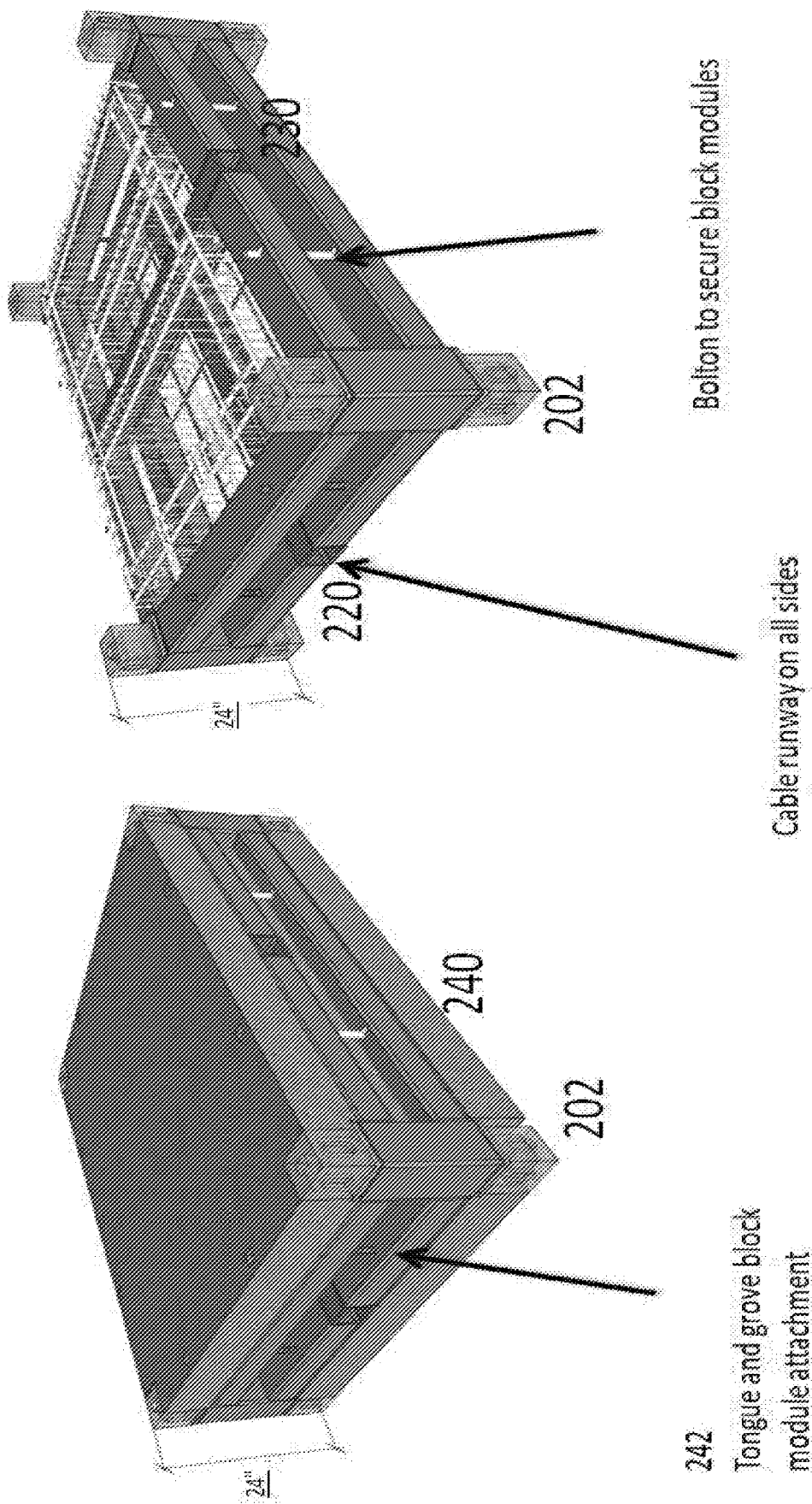
FIGS. 2-3 show in more details an individual ballast support frame.
Figure 3:
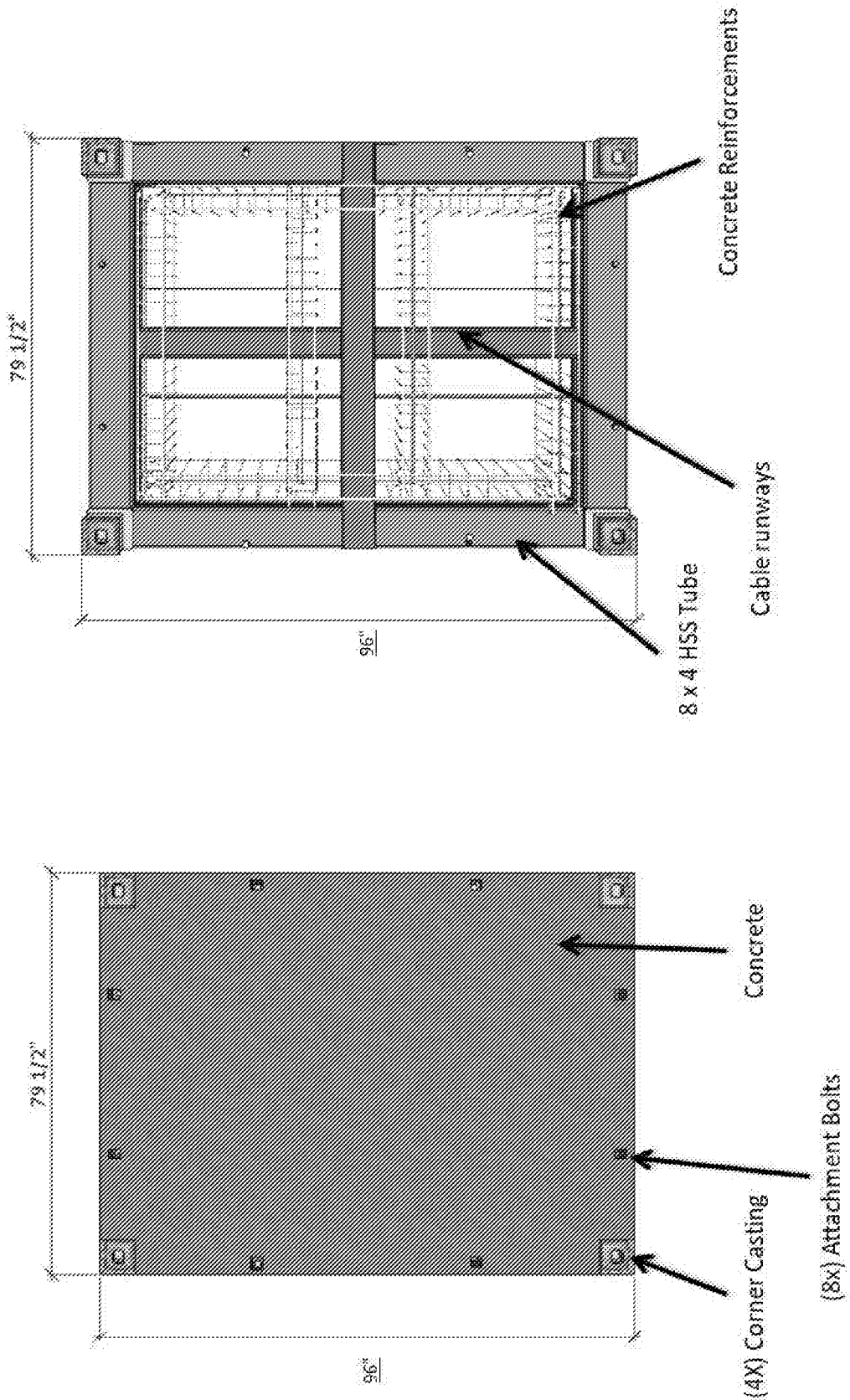

FIGS. 2-3 show in more details perspective views of an individual support frame 200. The frame is a metal structure with an upper frame that is substantially square or rectangular shaped and provides a recess to receive the support beam 220, and the recess is adequate to receive electrical/optical cables runway on one or more sides of the recess. Similarly, the frame 200 has a lower frame that is substantially square shaped and provides a recess to receive the support beam 230, and the recess is adequate to receive electrical/optical cables runway on one or more sides of the recess. The upper and lower frames are secured together using bolts to secure the frames together. The upper and lower frames are also interconnected using the corner posts 202. The ballast frame 200 is attached to two concrete slabs 240, one on top and one on bottom, to provide ballast weight. The frames 200 are interconnected to each other using a tongue and groove block module attachment 242.

Figure 4:
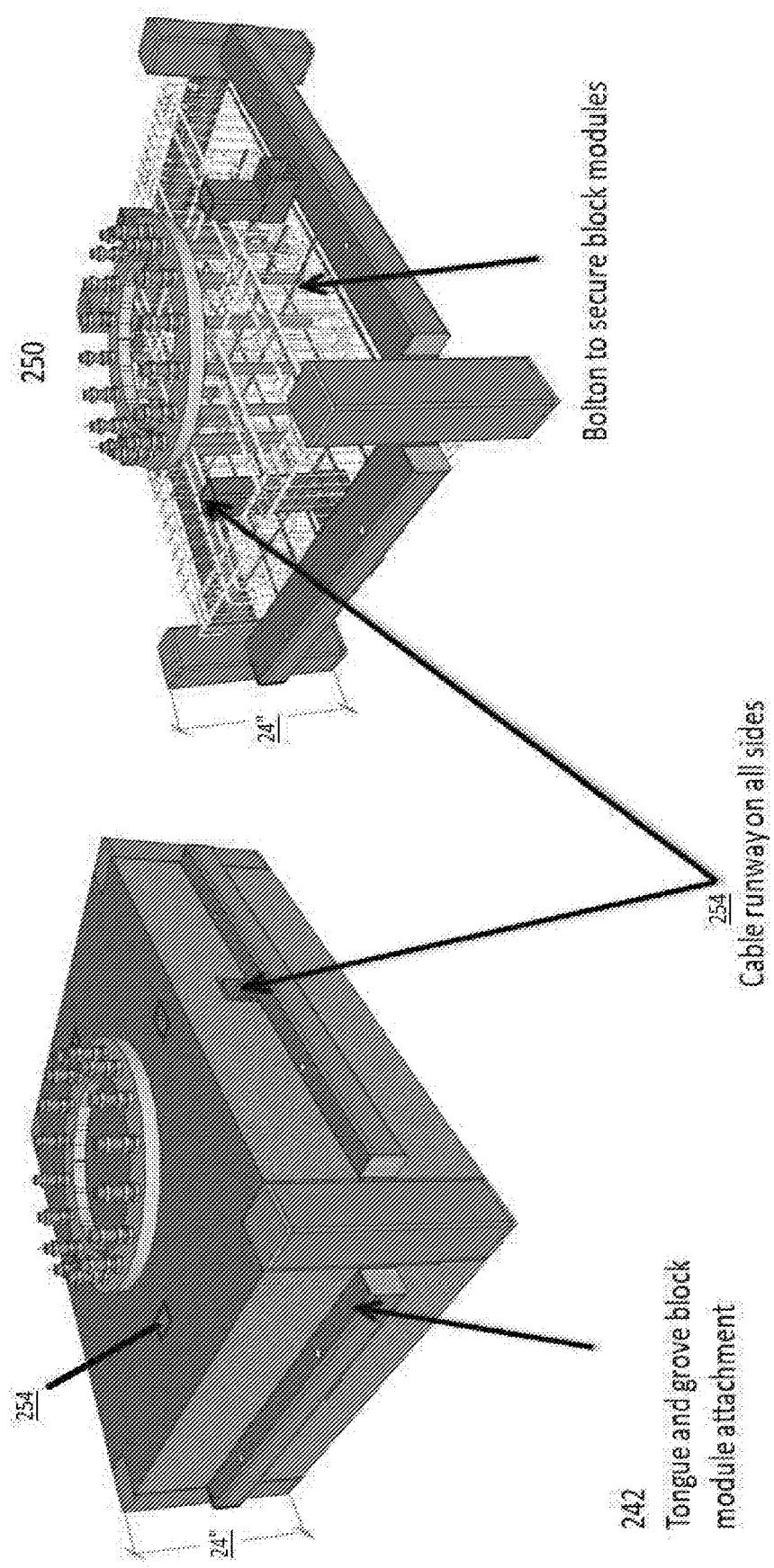
FIGS. 4-5 show in more details perspective views of a mast support frame.
Figure 5:
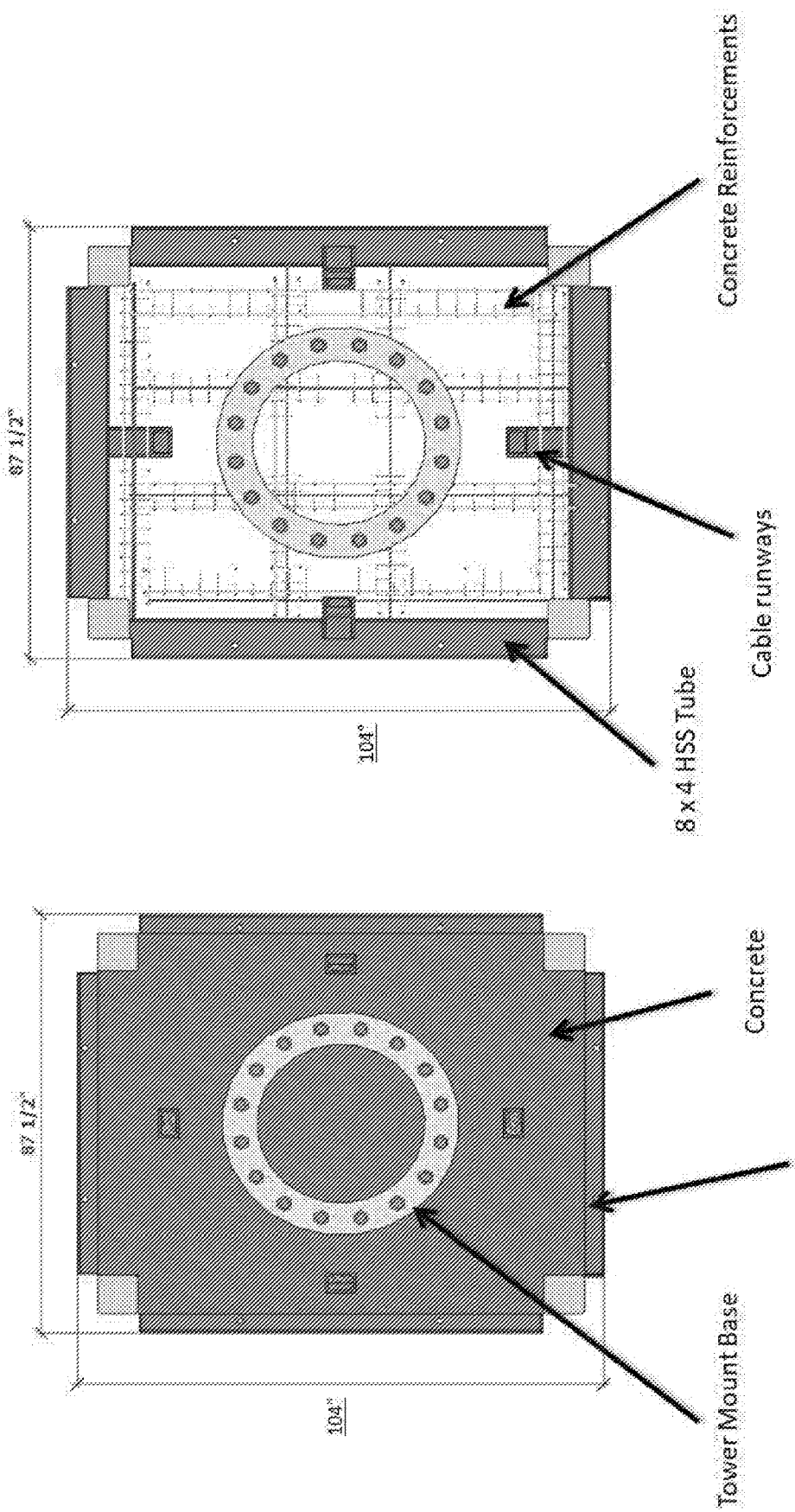

FIGS. 4-5 show in more details perspective views of a mast support frame 210. The frame 210 has the tongue and groove block module attachment 22 that allows the tongue of one frame to slide into the groove of another frame. An antenna mount 250 is centrally positioned in the mast support frame 210. The mount is secured with bolts to secure the mount to the concrete slab on which it rests. The mast in turn is secured to the mount 250 using a plurality of bolts. The mast support frame 210 also has a plurality of cable runways on all sides to facility electrical and optical connections to the antenna.

Figure 6:
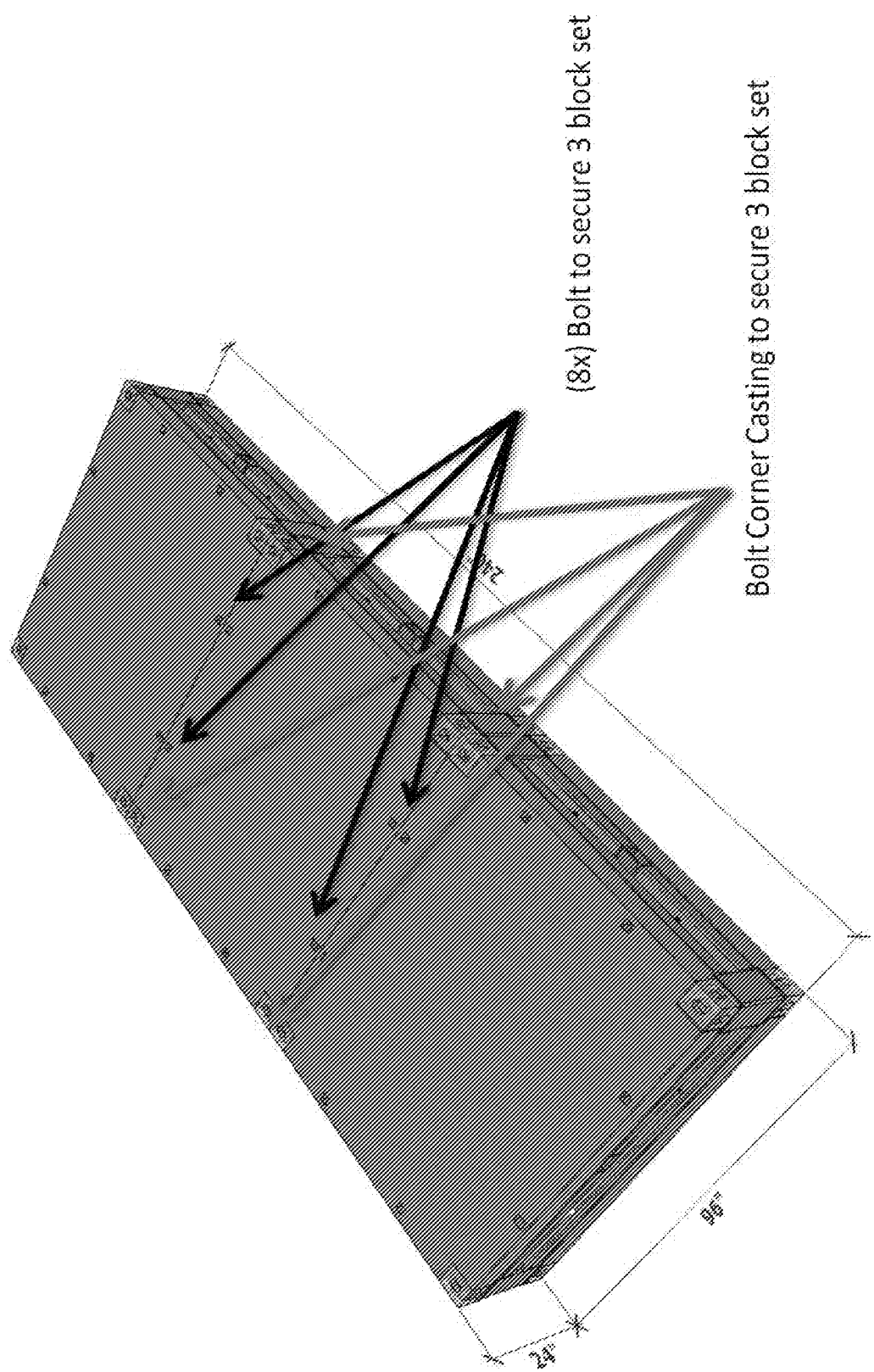
FIGS. 6-7 show views of various exemplary ballast assemblies using the frames of FIGS. 1-5.
Figure 7:
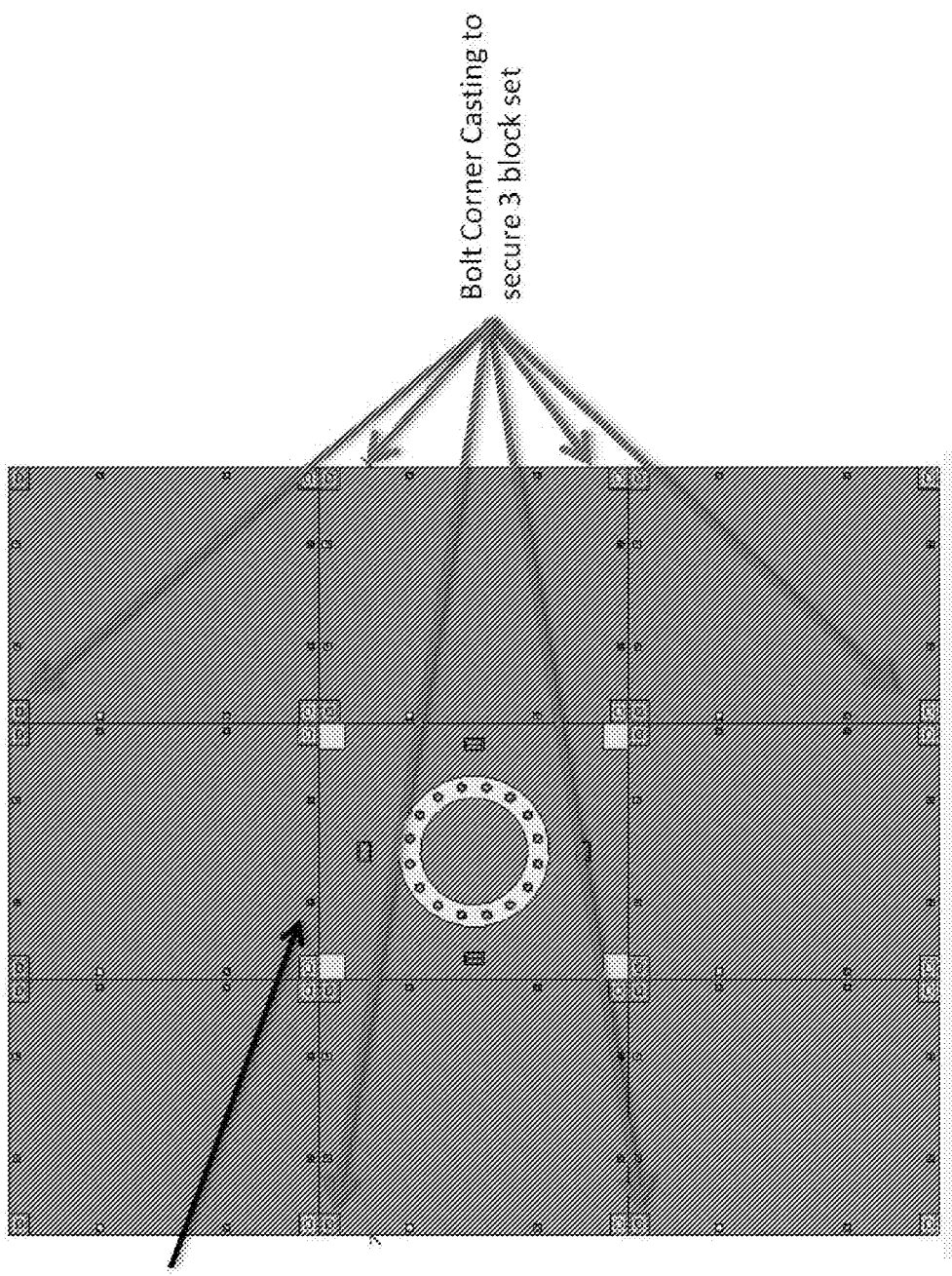
Figure 8:
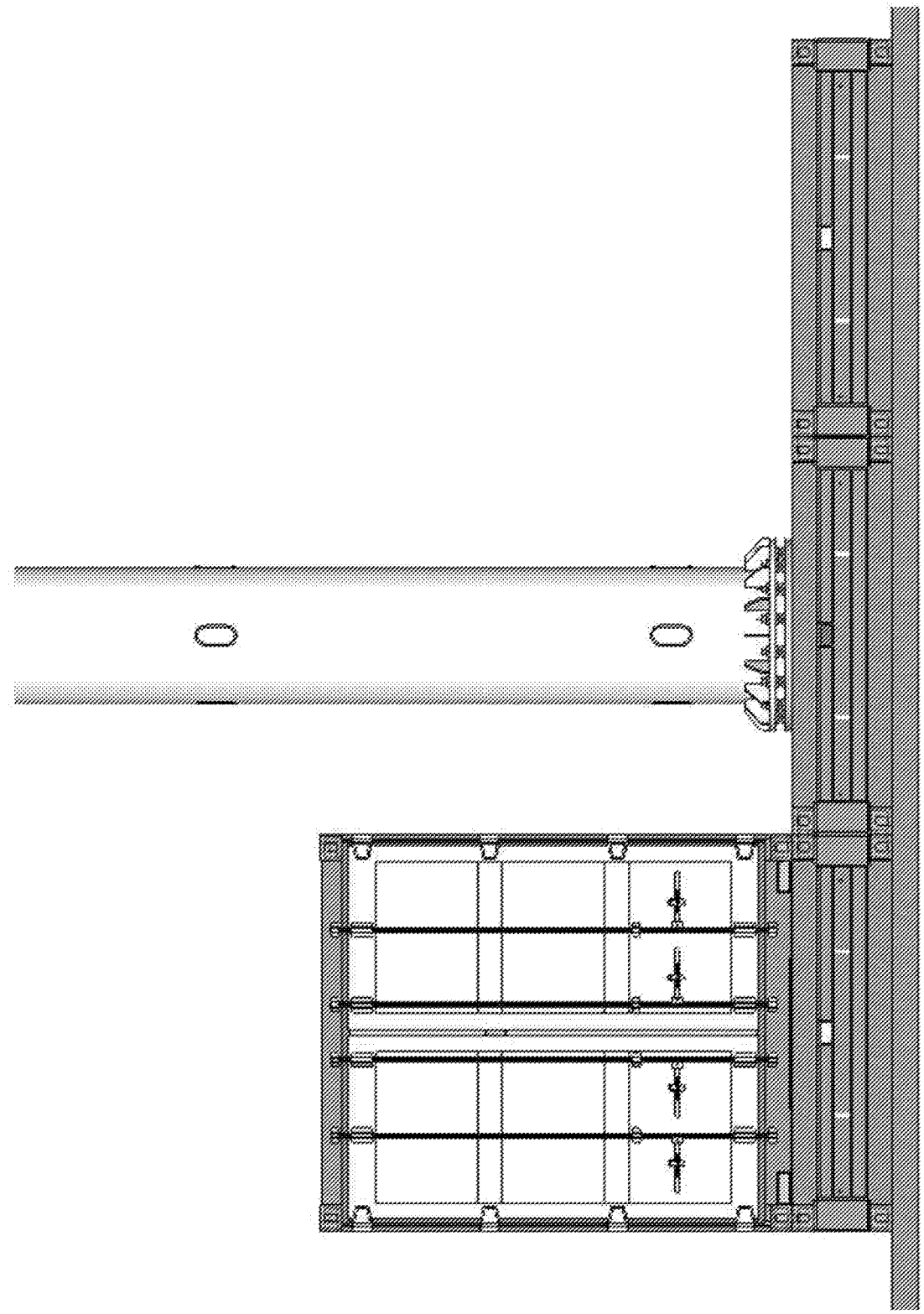
Figure 9:
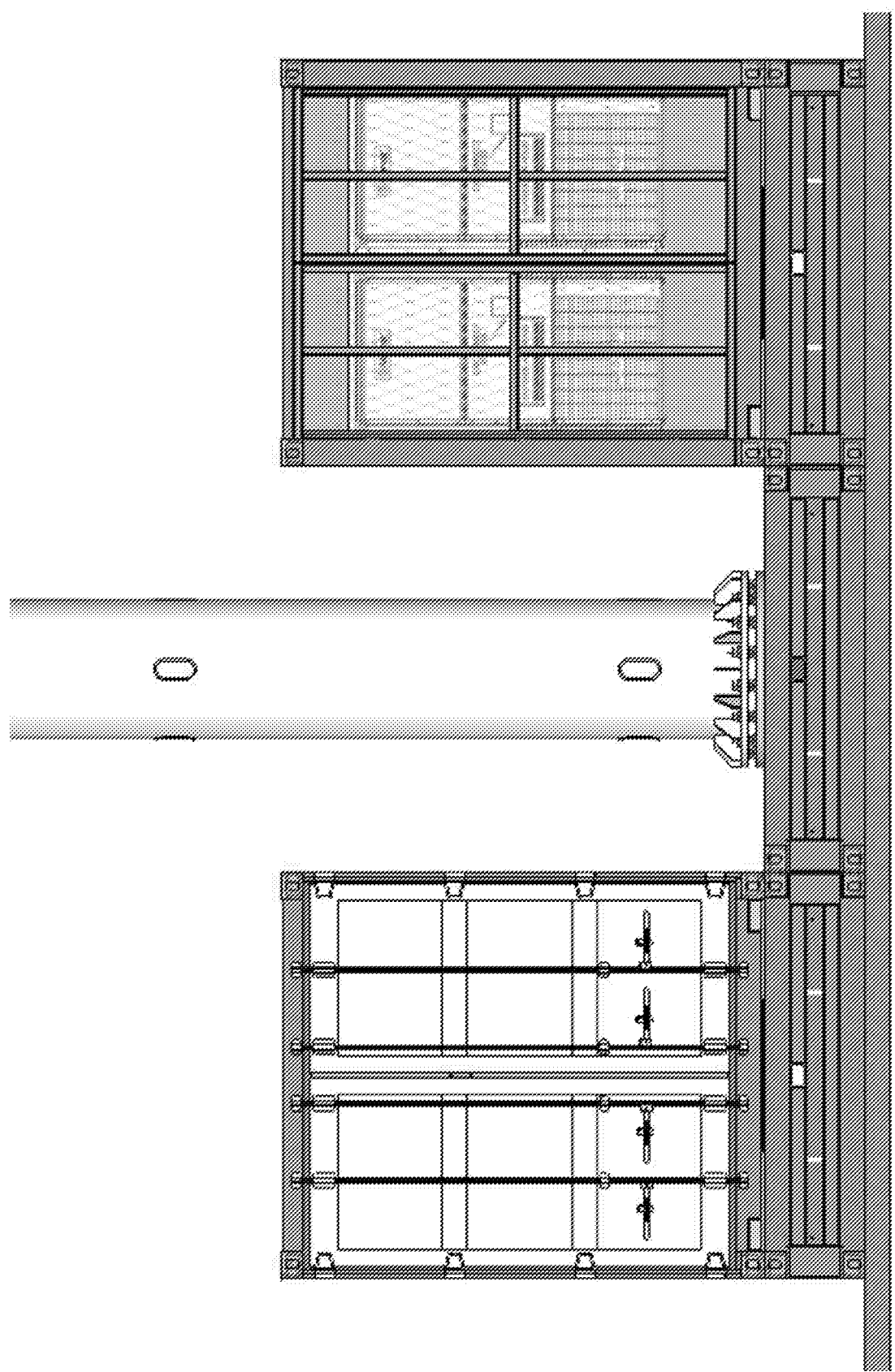

FIGS. 6-7 show views of various exemplary ballast assemblies using the frames of FIGS. 1-5. FIG. 8 shows a single carrier version with one shelter and the antenna mast, while FIG. 9 shows a two carrier version with two shelters and the antenna in between.

Figure 10:
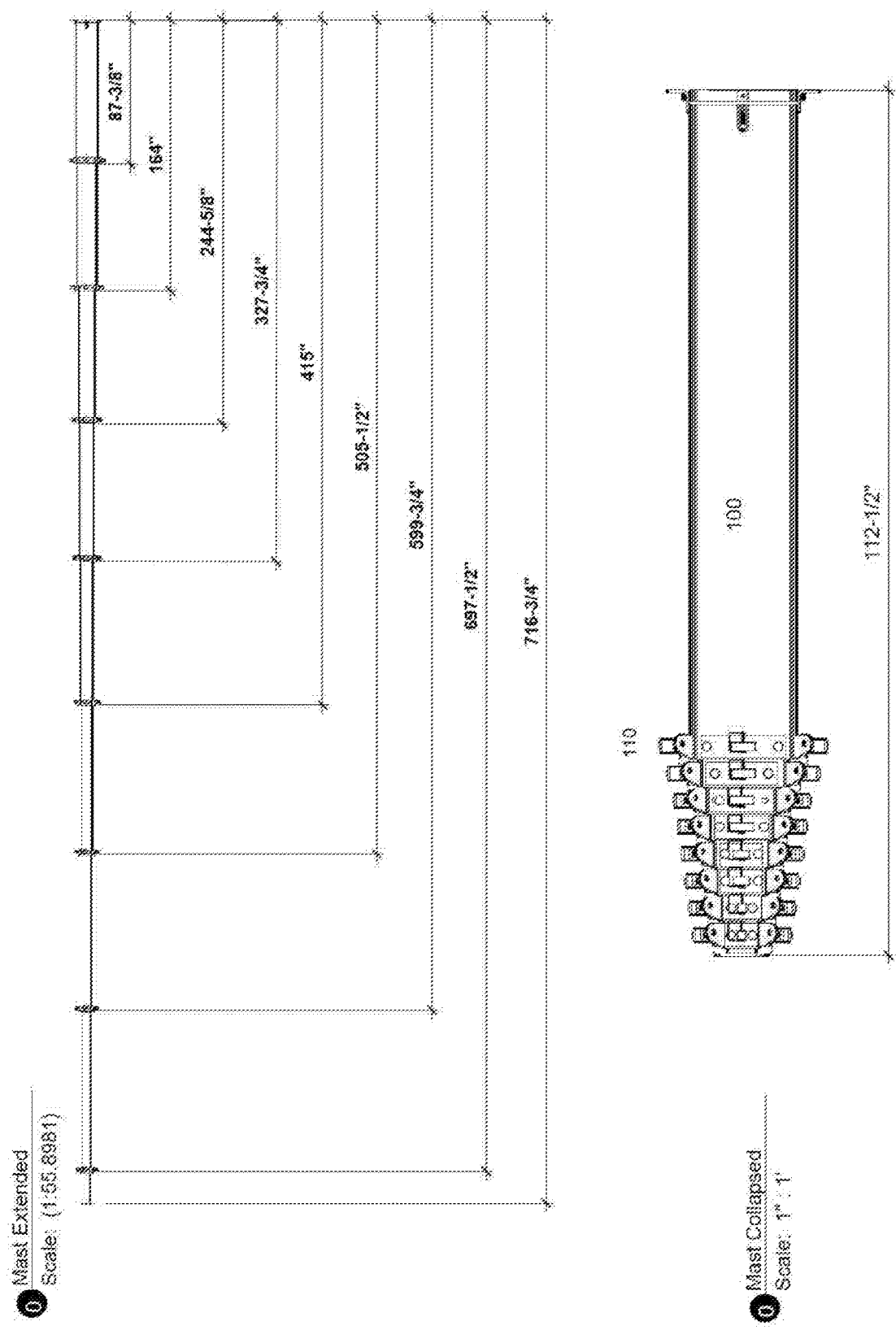
FIG. 10 shows an extendable antenna mast which telescopically extends the height of the antenna to maximize radio communication range in the extended configuration during operation and to minimize space in a collapsed configuration when the antenna is being transported.

FIG. 10 shows an extendable antenna mast which telescopically extends the height of the antenna to maximize radio communication range in the extended configuration during operation and to minimize space in a collapsed configuration when the antenna is being transported. As shown in FIG. 1, the collapsed configuration has a base unit 100 with a plurality of extension heads 110 on respective extended stages, each of which can be locked with pins to secure each extended stage. Once the locking pins are inserted, the stage cannot be collapsed, thus increasing support and safety for operators. In the collapsed configuration, the entire mast can be as short as 112-½" in length.

As shown in FIG. 10, when extended, the first stage can be 87-⅜", and the second stage can extend the antenna length to 164". The third stage can extend the length of the antenna up to 244-⅝". The fourth stage can extend the length of the antenna up to 317-¾". The fifth stage can extend the length of the antenna up to 415". The sixth stage can extend the length of the antenna up to 505-½". The seventh stage can extend the length of the antenna up to 599-¾". The eighth stage can extend the length of the antenna up to 697-½". The ninth stage can extend the length of the antenna up to 716-¾" in height, thus extending the communication range of the antenna considerably.

Figure 11:
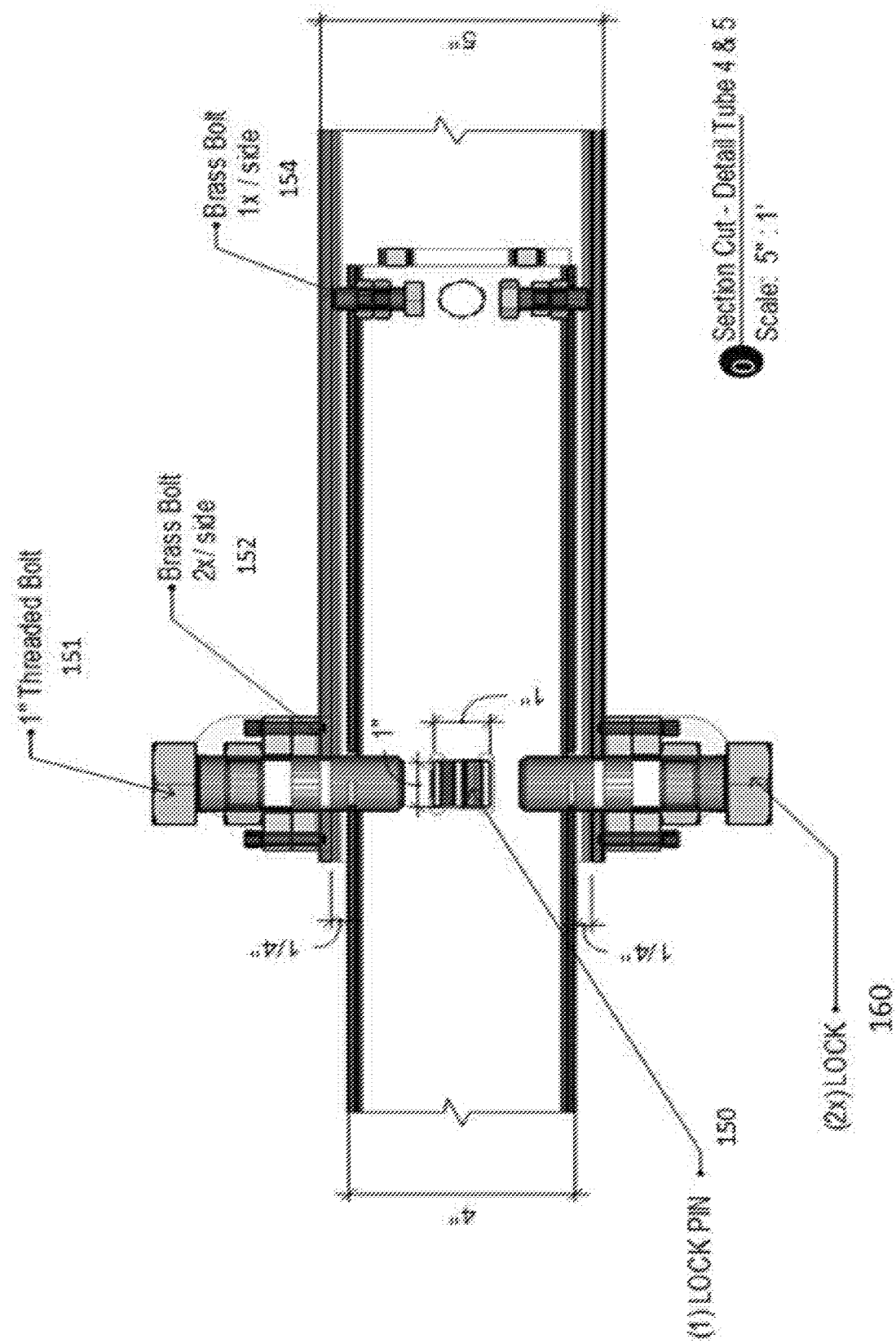
FIG. 11 shows one embodiment of exemplary top engagement unit.

FIG. 11 shows one embodiment of exemplary top engagement unit. FIG. 11 uses a section lock 160 with a threaded bolt 151 (Bolt-on Lock System), while other embodiments of the section lock 160 uses a spring loaded pin (Spring load lock System) in lieu of the bolt 151. The top engagement unit has a lock pin 150 that is positioned between two section locks 160 mounted on an outside section which has a 5" diameter in this example. The outside section receives an inside section having a 4" diameter in this example. Each section lock 160 has two brass bolts 152 per side. The twist lock and corner casting together form a rotating connector for securing two antenna mast sections. The locking pin is used for locking two adjacent mast sections into place. The lock pin 150 prevents potential collapse of the inside section into its containing outside section, thus protecting personnel and equipment during strong winds. The inside section as one bolt 154 per side. The height of the bolts 154 can be adjusted to position the inside section inside and adjust the angle relative to the outside section to adjust the spacing of the inside section relative to the outside section, among others.

In FIG. 11, the Bolt-on lock screw system can be screw driven in into treaded grooves to lock. When a ram 194 (FIG. 5) lifts the current tube section to its max height, the screw is driven to lock the inner and outer tubes in place. Typically, an actuator such as a motor or a ram extends through a base section to power a plurality of movable antenna sections adapted to fit inside of the base section, each movable antenna section including an outside section and an inside section. In the embodiment of FIG. 3A, the outside section has a plurality of threaded bolts (section locks) penetrating through threads on the inside and outside sections. The bolt is driven to extend at least 0.5 inch beyond the inside section toward the center of the inside section to prevent the inside section from collapsing into the outside section in an extended mode. The clearance can be approximately 0.5 inch to 1" to ensure the inside section is supported and avoid collapse. A lock pin is centrally positioned between the section locks to receive the ram or actuator to extend the antenna sections.

The Spring load lock pin system can use a spring to push a pin to lock. The embodiment of FIG. 3B is a twist lock where the spring is loaded by twisting a pin body. When the ram 194 lifts the tube section to max height, the spring pushes the pin into the inner tube hole cutout to lock the inner and outer tube in place. The spring loaded lock system has a locked state, where the spring loaded rod extends through the two mast segments by a considerable distance and in one embodiment projecting about 0.5" to 1" through the two mast segment sides to prevent accidental collapse of the mast segments. Moreover, a lock and open pin is provided to ensure that the rod is at its intended locked or open position.

Figure 12:
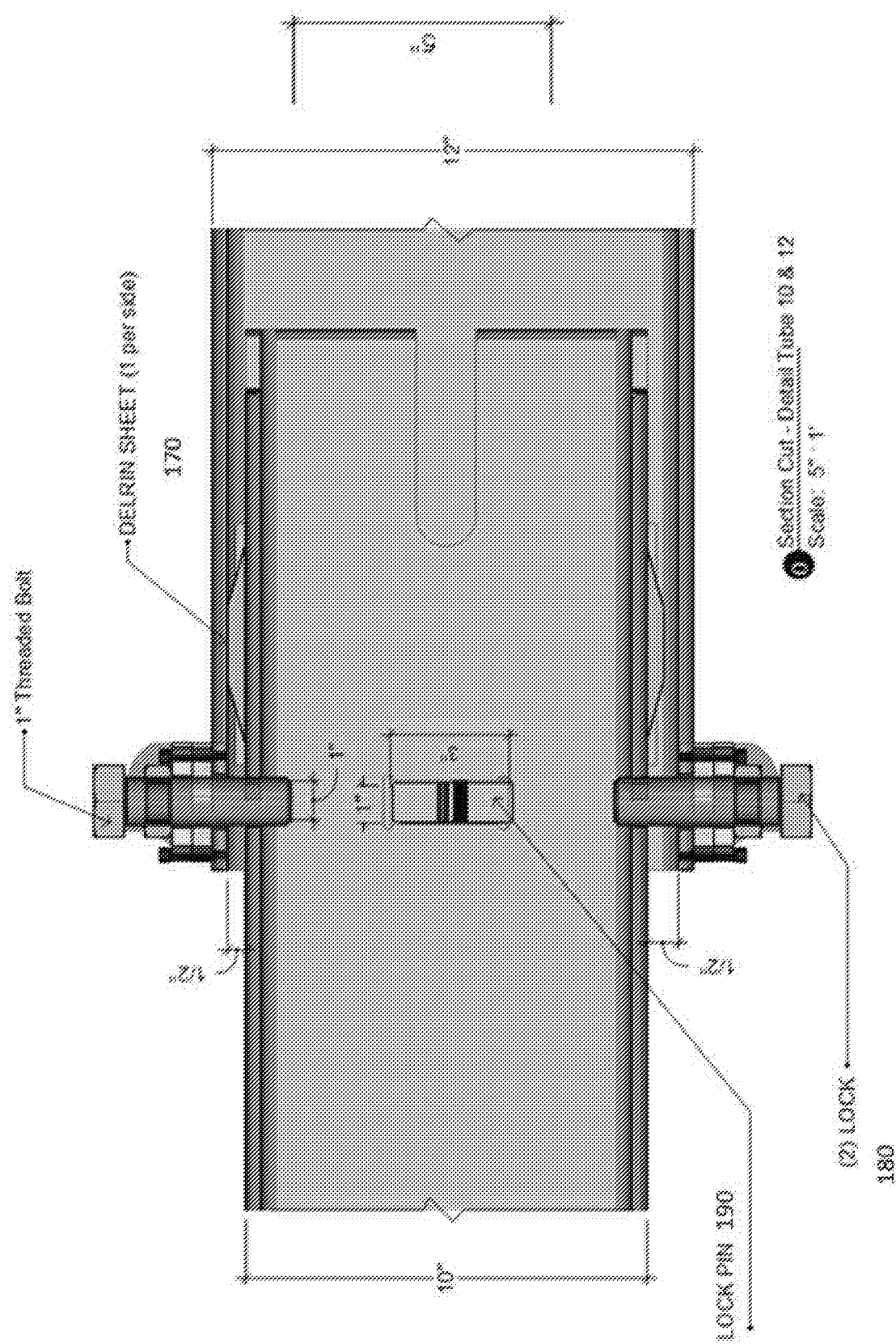
FIG. 12 shows an exemplary bolt section lock for the bottom engagement unit.

FIG. 12 shows an exemplary bolt section lock for the bottom engagement unit, while another embodiment shows in more detail the bottom engagement unit with two twist locks 180 on opposite sides of the outer section and a lock pin 190. A Delrin sheet 170 is positioned on each side below the twist locks. Delrin® is an acetal homopolymer with an excellent balance of properties that bridges the gap between metal and plastic. Delrin Sheet is known for low moisture absorption, high tensile strength, creep resistance, and durability. With chemical resistance to hydrocarbons, solvents and natural chemicals, Delrin sheets are ideal for industrial applications. Delrin Acetal's overall combination of physical, tribological and environmental properties make it ideal for many wear and mechanical applications. Parts exposed to a wet environment, like pump and valve components, are especially suitable. Delrin acetal resin, a product of DuPont, is formed from the polymerization of formaldehyde. The tightly interlocked helical molecules and high crystallinity result in excellent mechanical properties. Its superiority in tensile strength, stiffness, creep resistance, and fatigue classify it as an "engineering resin', a term used for plastics which can compete with metals in many applications. One of the important characteristics separating Delrin from other engineering plastics such as polyamides (nylons) is its very low water absorption and the small effect of aqueous solutions on its properties. The structure of Delrin is reviewed on several levels: chemical, crystallographic, lamellar, and spherulitic.

Figure 13:
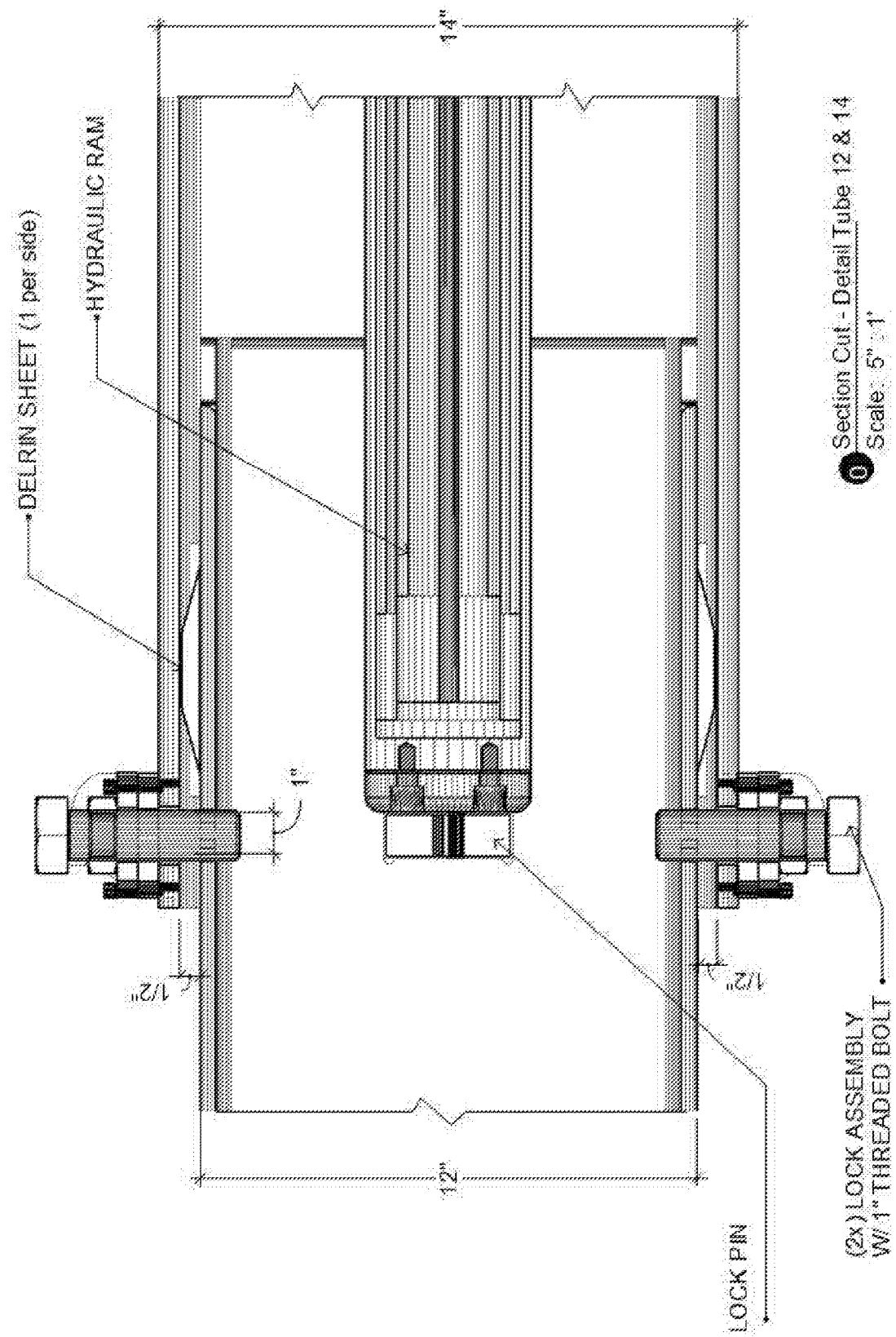
FIG. 13 show various exemplary extendable antenna masts with mast section locks and with hydraulic ram that actuates the extension or retraction of the sections.

FIG. 13 show various exemplary extendable antenna masts with mast section locks and with hydraulic ram that actuates the extension or retraction of the sections. For either embodiments, an exemplary hydraulic ram or motor actuates the extension or retraction of the sections. In one embodiment, a hydraulic ram 194 is adapted to engage the lock pin 190 of the base section, which as the ram 194 moves up or down, drives the inner sections up and down as they engage the corresponding lock pins for each section.

The Mast Ram or motor has two modes of operation: lifting and lowering.

The Lifting Process is as follows:
Both pins 180 extend to both inner and outer tube, and the lock pin 190 is then inserted to the tube, and hydraulic ram 194 extends to lift the inner tube.
Repeat procedure to lift all tube sections.

The Lowering Process is as follows:
Bottom lock pin 190 is removed to allow ram 194 to extend to upper lock pin 190, while pin 180 is still extended to both inner and outer tube.
When ram 194 makes contact to upper lock pin 190, pin 180 can now be retracted to lower the inner tube.
Repeat procedure to lower all tube sections.

Figure 14A:
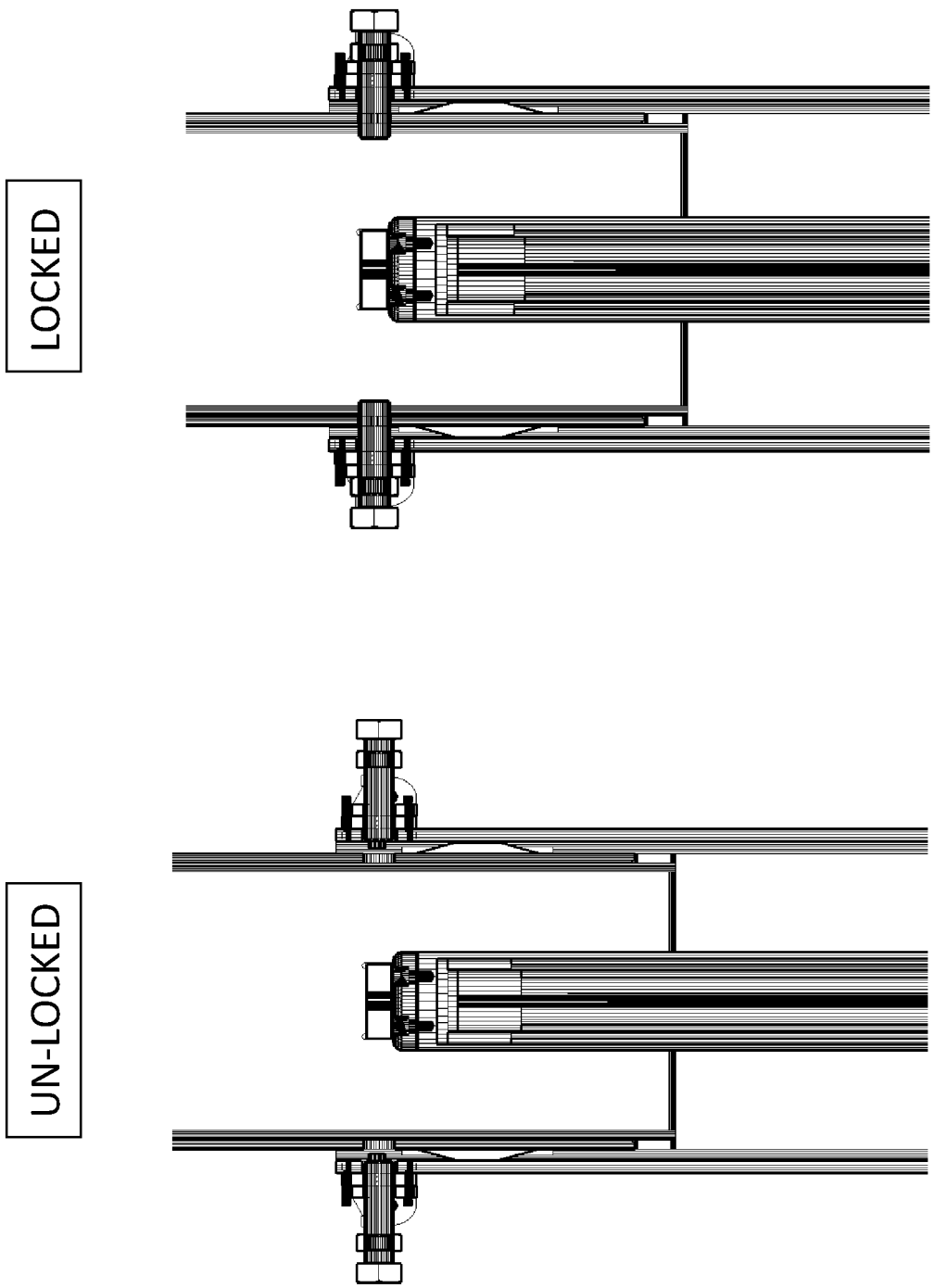

FIG. 14A shows a bolt lock system in unlocked and locked states, while FIG. 14B shows a twist lock system in unlocked and locked states, respectively.

Each embodiment of the mast securing system reduces risk of mast collapsing based on securing pin failure. The masts have portions that, as they extend, is usually pinned to secure the current segment and the next segment. However, as pins can fall out, the segments can collapse and cause injury. The hydraulic actuated mast is designed to fit inside the pod. It has a collapsed height of 9'-4" and can extended to the height of 60' in one embodiment. The mast consists of structural square steel tubing which telescope one section at a time by 3 stage hydraulic ram, for example. Any actuators such as motors or pneumatic systems can be used instead of the ram. Each section of the mast square tubing has a lock pin/ram push pin cut out, this pin is inserted to the section being erected pushed by the hydraulic ram. When the mast section is at the desired height, the section lock is engaged to lock the section in place for allowing the ram to come down and lift the next section. When the mast section is extended the section lock handle is rotated to allow the section lock pin to fully engage and penetrates to two mast section to lock in place so the ram can come down safely to lift the next mast section. The section lock can be a bolt system or a pin system.

Once extended, the antenna can communicate with greater range and fidelity. A receiver receives an electromagnetic signal via an antenna mounted on the extended antenna mast. A signal evaluator measures or determines a signal quality level associated with the received electromagnetic signal. The signal evaluator compares the measured signal quality level to a threshold minimum signal quality level. A current elevational position of the antenna mast is detected or tracked. The antenna mast is raised to a greater height than the current elevational position if the measured signal quality level is less than the threshold minimum signal quality level and if the current elevational position is less than a maximum height of the antenna mast.

A computerized system can be used to orient the antenna for maximum transmission. This is done by suitable motorized or pneumatic actuators that control the various functions of the antenna mast components. Finally, there is a need for a solid-state electronic control unit that has improved functionality and is simpler to use. Electromagnetic interference between the mast and the controller interface must be kept to a minimum by isolating the mast electrical ground from the mast antenna controller chassis ground. The advantages of the present invention can be achieved in an economical, practical, and facile manner.

In one aspect, a portable cellular site includes a modular shelter having pre-configured equipment to communicate with a telecommunication facility, wherein the shelter has the approximate dimensions of a standard International Organization for Standardization (ISO) freight container; a door to enter the shelter; a computer rack to receive computer equipment; a radio unit rack to receive wireless communication equipment; and air conditioning machine to cool the shelter interior.

Implementations of the aspect may include one or more of the following. Security bars can be used to protect equipment in the shelter. The computer rack is adjustable to handle different computer size. An air conditioning compartment is provided to house an air conditioner and security bars protect the air conditioner. An equipment compartment is provided, wherein the door is coupled to the equipment compartment, and wherein the equipment compartment is sealed from the environment. An antenna compartment houses the extendable mast. An actuator is used to elevate the antenna mast. A plurality of radio frequency entry openings to receive cables to an antenna. A ballast can be used to secure the shelter to the ground. The shelter can have first and second substantially parallel corner posts disposed at a first end of the shelter, the first and second corner posts having first and second ends; an upper frame support extending between the first ends of the first and second corner posts; a lower frame support extending between the second ends of the first and second corner posts, wherein the shelter has sufficient strength to withstand the forces of at least eight similar shelters stacked on top of the shelter. The shelter is configured to satisfy stacking test requirements when at least eight similarly dimensioned shelter are stacked on top of the shelter. A plurality of corner posts are used, wherein each of the corner posts comprises first and second connection blocks disposed adjacent the first and second ends of the corner post. One of the corner posts can have an interior cavity configured to receive a jack configured to assist with leveling the shelter. The system can have a jack configured to move the shelter from a truck to a ground without requiring a crane; and a hinge connecting the jack and one of the corner posts, wherein the hinge is configured to allow the jack to pivot from a first position in which the jack is disposed substantially within an interior cavity of the one of the corner posts to a second position in which the jack is disposed outside of the one of the corner posts.

In another aspect, a ballast system includes a substantially rectangular base with approximate bottom dimensions of a standard International Organization for Standardization (ISO) freight container; base locking units at each corner of the base to be secured to a shelter with approximate dimensions of a standard International Organization for Standardization (ISO) freight container; and extendable arms extending from the base to the ground.

In yet another aspect, a cellular communication system includes a modular shelter having pre-configured equipment to communicate with a telecommunication facility, wherein the shelter in combination with one or more additional modular shelters in combination conforms to the approximate dimensions of a standard International Organization for Standardization (ISO) freight container; each shelter having a door to enter the shelter; a computer rack to receive computer equipment; a radio unit rack to receive wireless communication equipment; and air conditioning machine to cool the shelter interior.

In further aspect, a cellular communication system, comprising a first shelter having pre-configured equipment to communicate with a telecommunication facility, wherein the shelter in combination with one or more additional modular shelters in combination conforms to the approximate dimensions of a standard International Organization for Standardization (ISO) freight container, and a second shelter stacked above the first shelter coupled to the stair, wherein the shelter in combination with one or more additional modular shelters in combination conforms to the approximate dimensions of the ISO freight container.

In another aspect, a cellular communication system includes a first shelter having pre-configured equipment to communicate with a telecommunication facility, wherein the shelter in combination with one or more additional modular shelters in combination conforms to the approximate dimensions of a standard International Organization for Standardization (ISO) freight container, and second, third and fourth shelters coupled at one end to an end near the antenna mast, wherein the antenna mast is secured to the first, second, third and fourth shelters, wherein each shelter conforms to the approximate dimensions of the ISO freight container.

In yet another aspect, a cellular communication system includes a first shelter having pre-configured equipment to communicate with a telecommunication facility, wherein the shelter in combination with one or more additional modular shelters in combination conforms to the approximate dimensions of a standard International Organization for Standardization (ISO) freight container; and one or more additional shelters positioned in parallel or spaced apart from the first shelter coupled to the stair, wherein the shelter in combination with one or more additional modular shelters in combination conforms to the approximate dimensions of the ISO freight container.

In a further aspect, a transport system includes a trailer with a transport bed adapted to receive a shelter having substantially rectangular base with approximate bottom dimensions of a standard International Organization for Standardization (ISO) freight container; first and second wheeled transport assembly positioned on the trailer, wherein each transport assembly is adapted to connect to each end of the shelter to move the shelter on or off the trailer; and base locking units at each corner of the bed to be secured to a shelter.

Figure 15A:
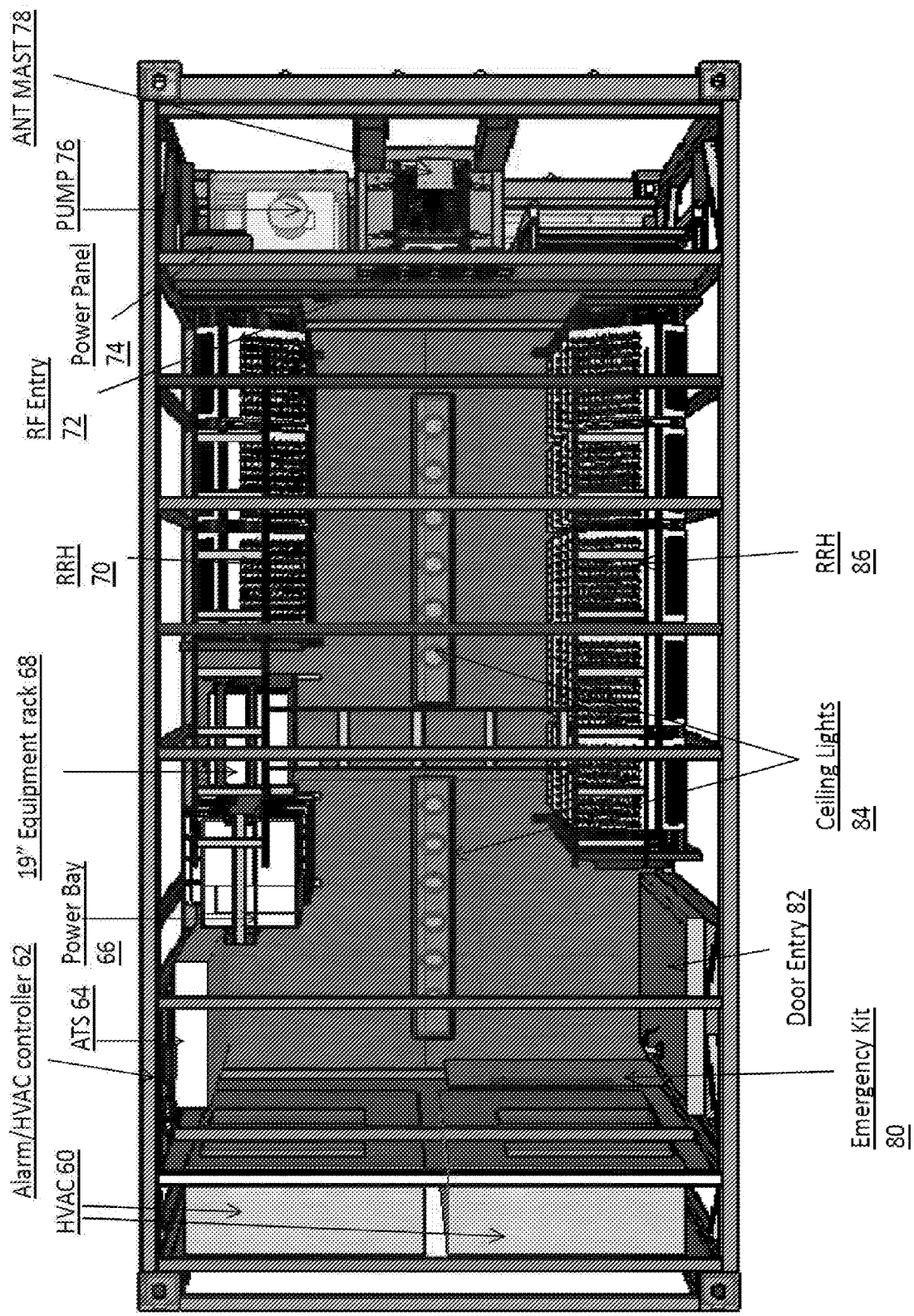
FIGS. 15A-15B show exemplary views of the antenna in a transportation container or a pod.
Figure 15B:
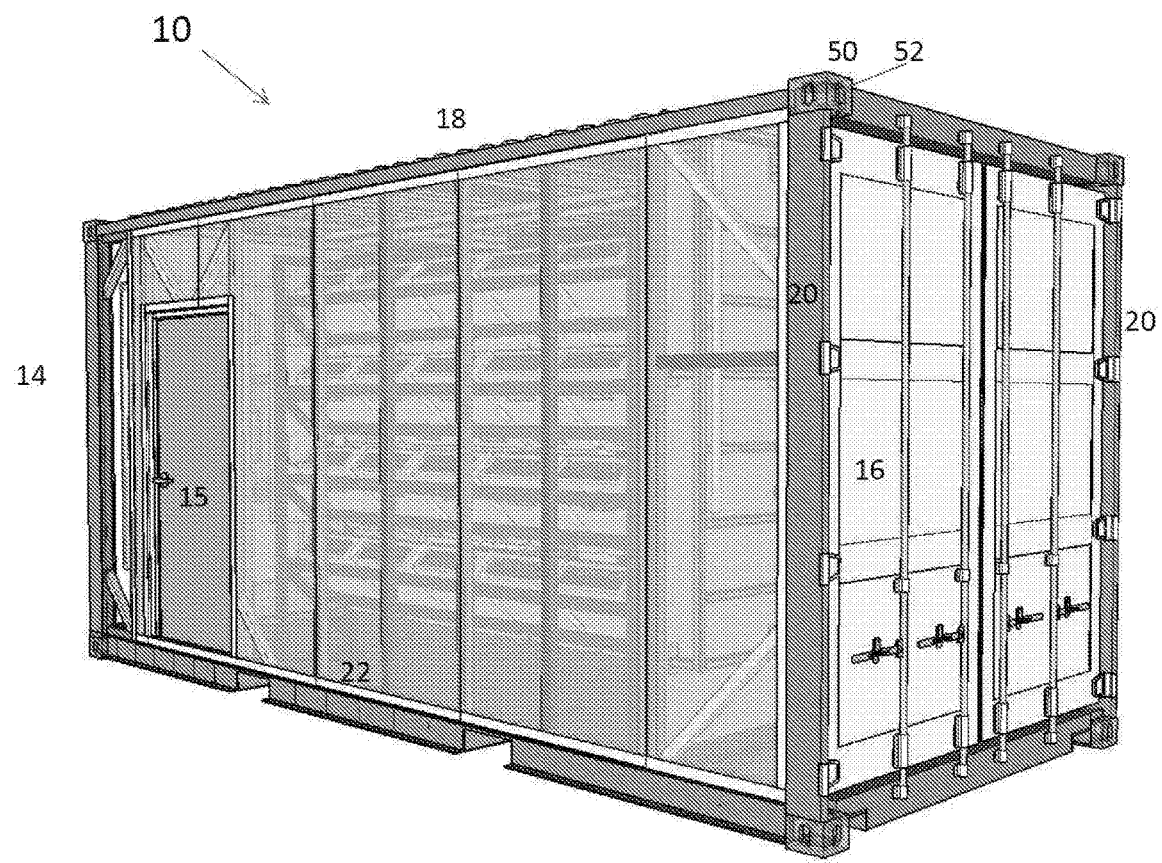

FIG. 15A shows an exemplary top view of the antenna in a shipping container or pod shown in FIG. 15B, while FIG. 16 shows an exemplary mast side and HVAC side view of the pod of FIG. 15A. FIG. 15A shows the components inside the pod of FIG. 15A. The pod has air conditioning unit (HVAC) 60 to cool internal temperature. This can be controlled by an HVAC controller 62. A door entry is provided to allow operator access for maintenance, and next to the door is an emergency kit 80. Across from the door entry 82 is an ATS 64 and power bay 66. Equipment rack 68 is provided, and can handle the standard 19-inch racks, commonly for servers or networking devices. A plurality of remote radio head (RRH) 70 and 86, also called a remote radio unit (RRU) is provided for communication in wireless networks. The RRH is a remote radio transceiver that connects to an operator radio control panel via electrical or wireless interface. In wireless system technologies such as GSM, CDMA, UMTS, LTE the radio equipment is remote to the BTS/NodeB/eNodeB. The equipment is used to extend the coverage of a BTS/NodeB/eNodeB in challenging environments such as rural areas or tunnels. They are generally connected to the BTS/NodeB/eNodeB via a fiber optic cable using Common Public Radio Interface protocols. RRHs have become one of the most important subsystems of today's new distributed base stations. The RRH contains the base station's RF circuitry plus analog-to-digital/digital-to-analog converters and up/down converters. RRHs also have operation and management processing capabilities and a standardized optical interface to connect to the rest of the base station. Remote radio heads make MIMO operation easier; they increase a base station's efficiency and facilitate easier physical location for gap coverage problems. RRHs typically use the latest RF component technology including Gallium nitride (GaN) RF power devices and envelope tracking technology within the RRH RF power amplifier (RFPA). Fourth-generation (4G) and beyond infrastructure deployments will include the implementation of Fiber to the Antenna (FTTA) architecture. FTTA architecture has enabled lower power requirements, distributed antenna sites, and a reduced base station footprint than conventional tower sites. The use of FTTA will promote the separation of power and signal components from the base station and their relocation to the top of the tower mast in a Remote Radio Head (RRH). According to the Telcordia industry standard that establishes generic requirements for Fiber to the Antenna (FTTA) protection GR-3177, the RRH shifts the entire high-frequency and power electronic segments from the base station to a location adjacent to the antenna. The RRH will be served by optical fiber and DC power for the optical-to-electronic conversion at the RRH. RRHs optionally has Surge Protective Devices (SPDs) to protect the system from lightning strikes and induced power surges. There is also a change in electrical overstress exposure due to the relocation of the equipment from the base station to the top of the mast. The RRHs can be installed in a low-profile arrangement along a rooftop, or can involve a much higher tower arrangement.

The RRH 70 and 86 have cables that are routed through the RF entry points 72 and connected to an antenna with a mast 78. The antenna mast 78 supports the mounting of antenna. The antenna may be used for reception, transmission or both reception and transmission of an electromagnetic signal. The mast may be limited in height because of obstructions in the environment. Obstructions may include vegetation, vine canopies, tree canopies, bridges, traffic signals, buildings or otherwise. The limitation in height of the antenna may limit the maximum range of effective communications between the vehicle and a communications device located remotely apart from the vehicle. For example, electromagnetic radiation that is in the microwave frequency range may be limited to propagation in line-of-sight paths or may be severely attenuated by ground clutter where antenna height is insufficient for a requisite level of clearance. Accordingly, the mast 78 is used to extend the height for maximizing the available antenna height of an antenna mast mounted on a vehicle to improve the range and reliability of communications.

FIG. 16 shows an exemplary mast side and HVAC side view of the pod of FIG. 1. The mast 78 is moved up or down using a pneumatic pump 76 and controlled by a controller. To support raising and lowering of the antenna mast 78, a retractable tensioner can be used for receiving or releasing the transmission line. In one configuration, the retractable tensioner comprises a reel or spool upon which the transmission line is wound to a great extent when the antenna mast is fully lowered and to a lesser extent (or not at all) when the antenna mast is fully raised. The spool may be spring-loaded to retract the transmission line and a releasable ratchet mechanism (e.g., a generally circular gear with teeth, the gear mounted coaxially to the spool, where the teeth engage a movable pawl) may prevent the spool from moving when the tower is elevated above its lowest height. A signal evaluator measures or determines a signal quality level associated with the received electromagnetic signal. The signal evaluator is arranged to compare the measured signal quality level to a threshold minimum signal quality level. The user or a technician may establish the threshold minimum signal quality based on one or more of the following: (1) target reliability (e.g., 99.9% reliability) or target availability of communications (e.g. reception, transmission or both) for the antenna and associated communications equipment, (2) a maximum bit-error rate for digitally modulated signals, (3) a minimum signal-to-noise ratio, and (4) a minimum signal strength. The threshold minimum signal quality may vary with the environment or location of the vehicle and may vary over time, such that time-averaged readings of the measured signal are used for signal quality determinations. In one embodiment, the signal quality comprises the measured signal-to-noise ratio of the received signal and the minimum signal quality level comprises a minimum signal-to-noise ratio defined by a user or technician. In another embodiment,the signal quality comprises signal strength of the received signal, and the minimum signal quality level comprises a minimum signal strength defined by a user or technician.

Further, a power panel 74 receives power into the pod. Power may be provided by line to a connector from a source, such as a peripheral mechanical module to power communications panel. Heating, ventilation and air conditioning may be provided through supply and return ducts which may connect to adapter plates. Communication lines (not shown) may connect with connectors. Clean and waste water lines, respectively, may be connected to adapter plate which is interchangeable with other adapter plates. Power from panel 74 may be supplied to sub panels to supply power to outlet strips (not shown) and lights 84.

A leveling bubble may also be provided for manual leveling of the telco shelter 10. Preferably, however, the telco shelter is self-leveling. A self-leveling control panel 168 allows the telco shelter to level itself through the use of built-in sensors and software. A typical self leveling unit employs an inclinometer and electric motors and gear reducers to operate jacks described below in a known manner to level telco shelter 10.

To enhance placement without requiring a crane, in one embodiment, each post 20 contains a jack. The jack is normally in a stowed or retracted position, and extends in a deployed condition to support the pod when the truck is moved. The jack is then retracted to bring the pod to the ground in a controlled manner and the jack can be removed afterward. Jack typically includes a ram for leveling of telco shelter 10. Typically, each jack is disposed within an interior cavity of post 20 in the retracted position. A cover plate may be disposed on the front of housing. In one embodiment, cover plate may have integral cross bolts that may lock the cover plate and jack in a stowed position. A bracket may be attached to the front of cover plate and may be used to manually pull the jack out of the post 20 and swing it into its deployed condition. There may also be a manual access knob that permits access to a socket for a hand crank that can be used to manually crank down the ram of jack, for leveling of telco shelter 10 in the absence of any power. Alternatively, or in addition, ram may be driven by an electromechanical motor. Electrical power and sensor wires may be attached at connectors at the top end of housing. The bottom end of ram may be filled with a stabilizing foot.

Containers suitable for transportation by truck, ship, or air must generally comply with the standards and regulations for ship freight set forth by ISO and CSC. Furthermore, containers that are transported by helicopter must be able to support the dynamic load imposed by the lifting of the containers, which is typically about three times the static load. Heretofore, such containers generally have a metal framework, i.e., a post-and-beam construction, with composition board (usually steel or aluminum sheathed) or other composite material panels attached to the framework by bolts, rivets, welding, and the like. Such containers, however, are inherently heavy. For example, a standard 20-feet long container constructed to meet ISO size requirements (typically 8 feet wide by 8 feet high) weighs on the order of 4,000 to 5,000 pounds. As a result, the maximum cargo or payload that can be transported in such a container is generally limited to two to three times the tare weight, or empty weight, of the container. Furthermore, the side, roof, and floor panels of the metal-framed container typically do not support any structural loads or provide any structural resistance to externally applied forces. The metal framework of these containers must therefore have sufficient mass and structural strength to support both the cargo load and any externally applied forces. More recently, instead of metal framework, some transportable containers that have been constructed to meet ISO size requirements have been formed of composite material panels. These containers may not be able to handle hurricane level wind. To address this, a base ballast can be used.

Figure 17:
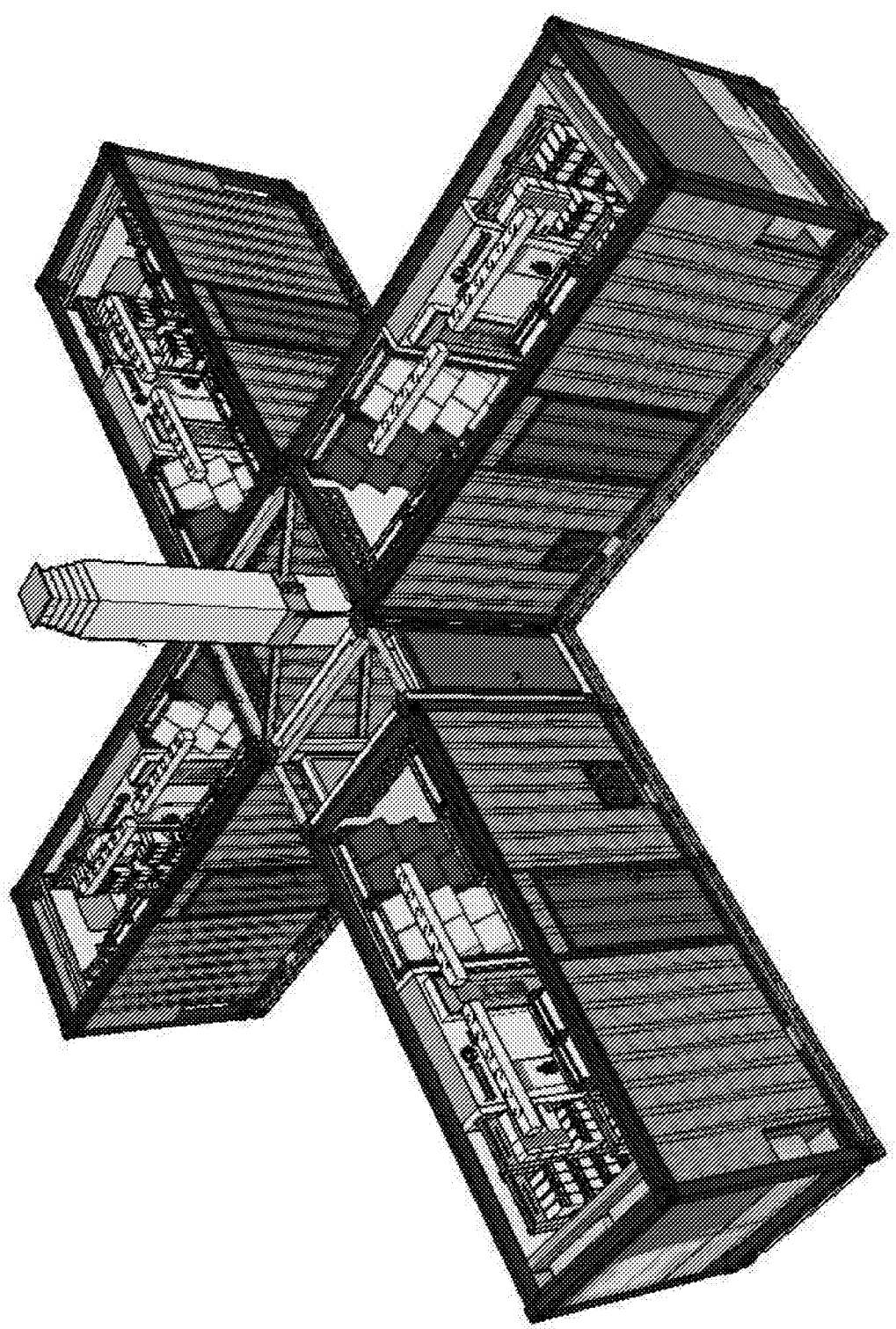
FIG. 17-18 shows exemplary pods that are stacked horizontally, vertically, or in an X configuration to provide extra support to the antenna mast.
Figure 18:
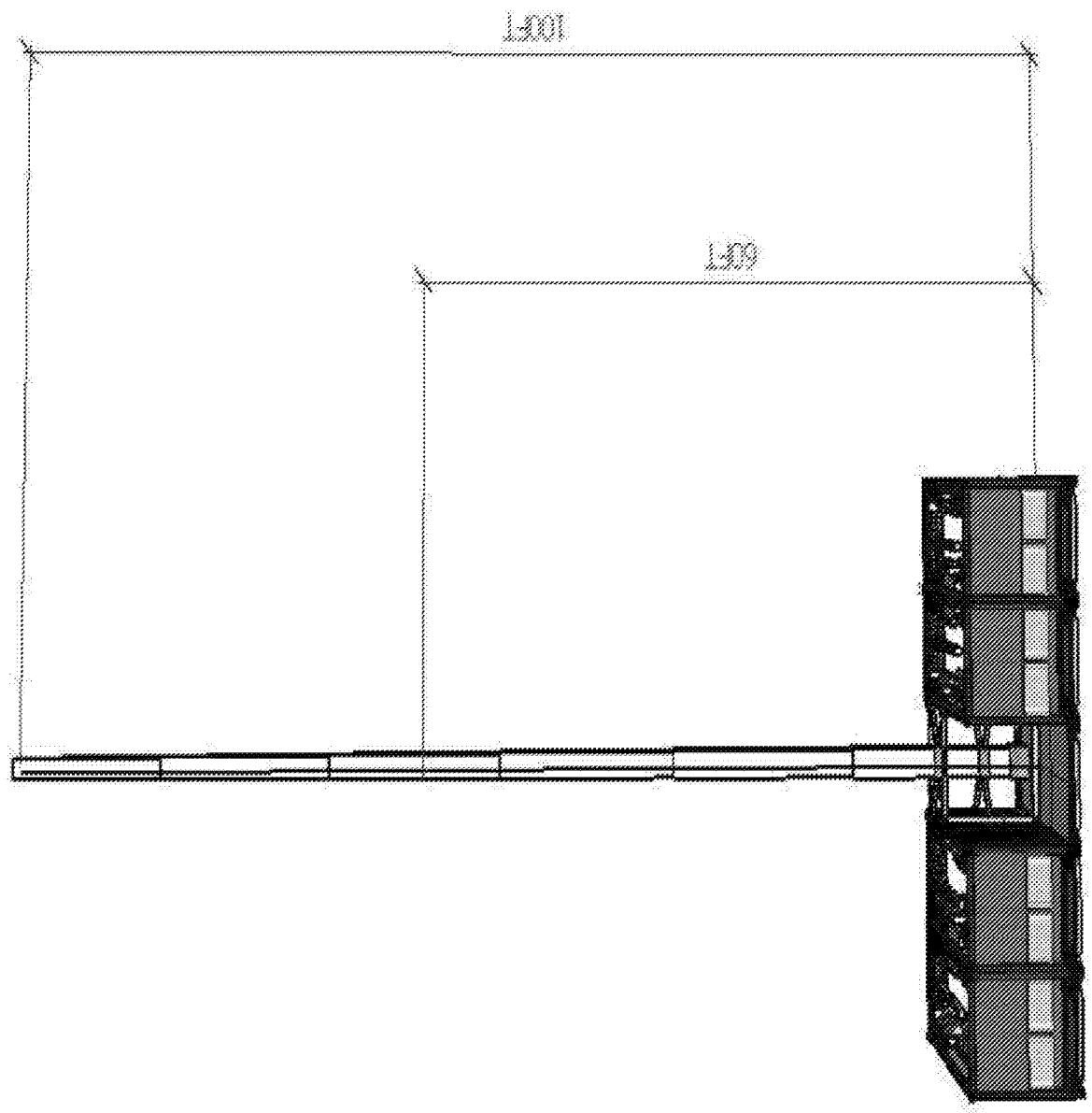

FIG. 17-18 shows exemplary pods that are stacked horizontally, vertically, or in an X configuration to provide extra support to the antenna mast. FIG. 17 show an exemplary co-location X-configuration of four pods. In this configuration, the cellular communication system includes a first shelter having pre-configured equipment to communicate with a telecommunication facility, wherein the shelter in combination with one or more additional modular shelters in combination conforms to the approximate dimensions of a standard International Organization for Standardization (ISO) freight container. Additionally, second, third and fourth shelters are connected at one end to an end near the antenna mast, wherein the antenna mast is secured to the first, second, third and fourth shelters, wherein each shelter conforms to the approximate dimensions of the ISO freight container. Each shelter can include:

a door to enter the shelter;
a computer rack to receive computer equipment;
a radio unit rack to receive wireless communication equipment;
an extendable antenna mast; and
air conditioning machine to cool the shelter interior;

In an exemplary co-location stack-configuration of four pods, a first shelter has pre-configured equipment to communicate with a telecommunication facility, wherein the shelter in combination with one or more additional modular shelters in combination conforms to the approximate dimensions of a standard International Organization for Standardization (ISO) freight container. A second shelter can then be stacked above the first shelter coupled to the stair, wherein the shelter in combination with one or more additional modular shelters in combination conforms to the approximate dimensions of the ISO freight container. A stair coupled to a side of the shelter, and the shelter can also have balcony for various needs.

In an exemplary co-location inline configuration of four pods, this configuration has a first shelter having pre-configured equipment to communicate with a telecommunication facility, wherein the shelter in combination with one or more additional modular shelters in combination conforms to the approximate dimensions of a standard International Organization for Standardization (ISO) freight container and one or more additional shelters positioned in parallel or spaced apart from the first shelter coupled to the stair, wherein the shelter in combination with one or more additional modular shelters in combination conforms to the approximate dimensions of the ISO freight container. Other embodiments are described in co-pending commonly owned application Ser. No. 15/814,387 filed Nov. 15, 2017, the content of which is incorporated by reference.

Figure 19:
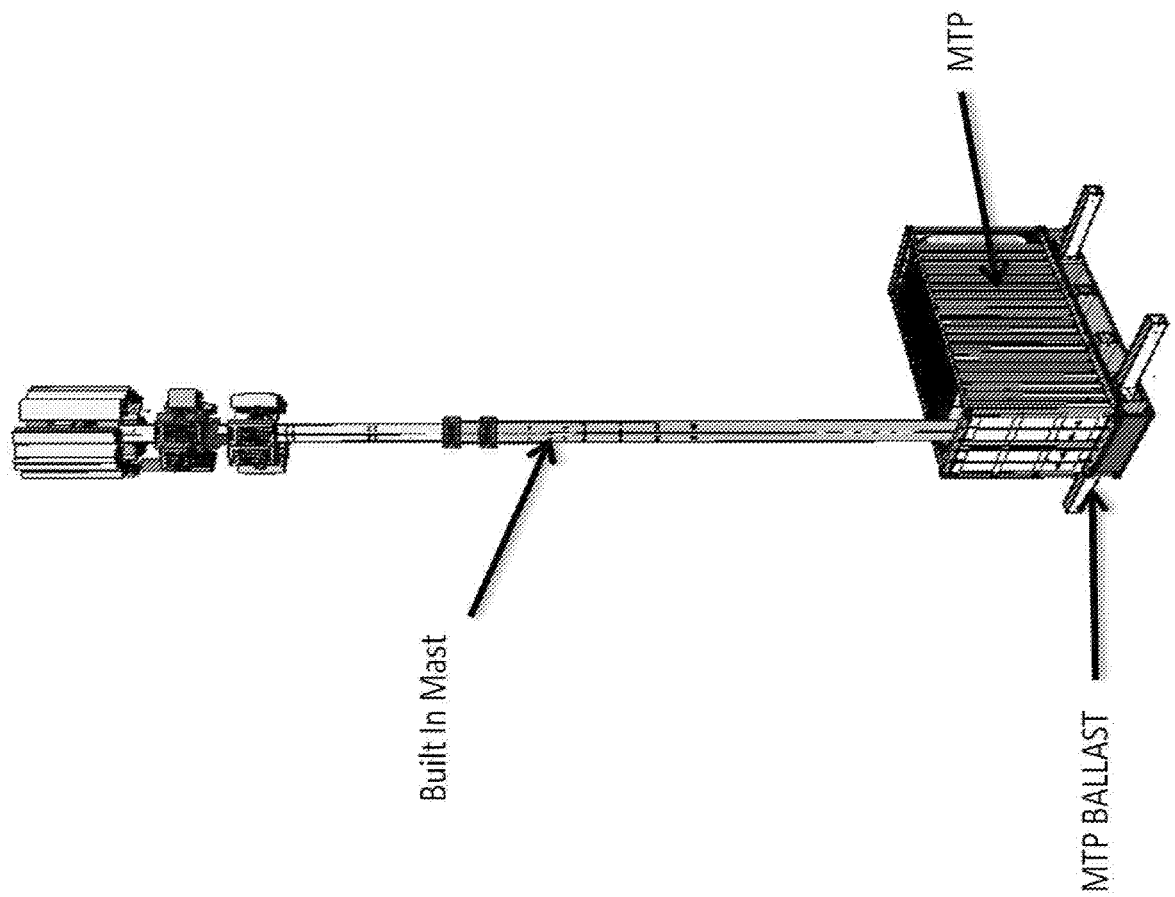
FIGS. 19-23 and FIGS. 24A-24B show additional ballast embodiments.
Figure 20:
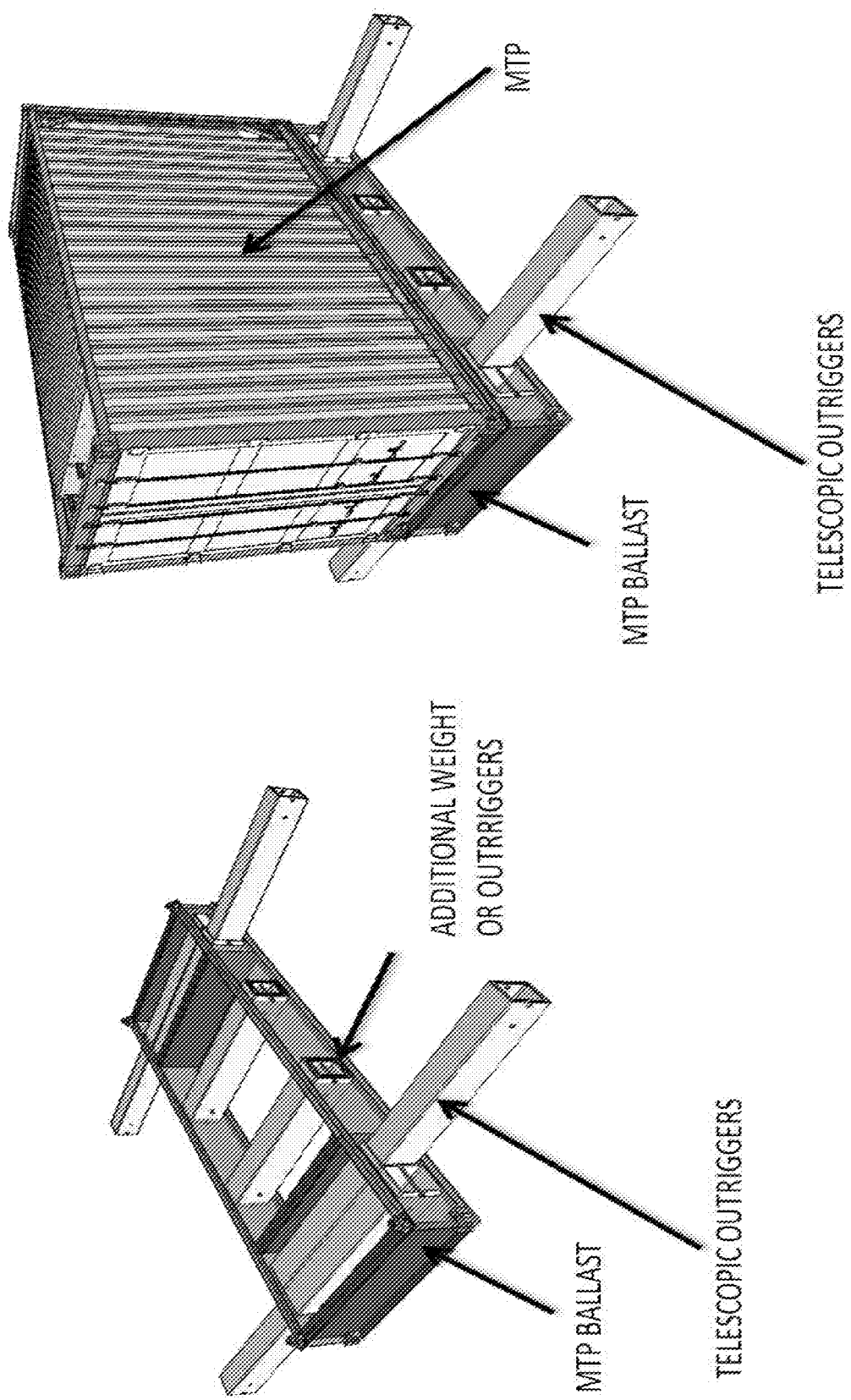

FIGS. 19-23 and FIGS. 24A-24B show additional ballast embodiments. FIG. 19 shows a ballast with a built-in mast that supports wireless antenna and electronics on top of the mast. FIG. 20 shows in more details the telescopic outriggers extending from the interior of the ballast. Additionally, the ballast includes additional couplings near the center of the ballast to receive additional weights or outriggers. The container or payload is then secured above the ballast.

Figure 21:
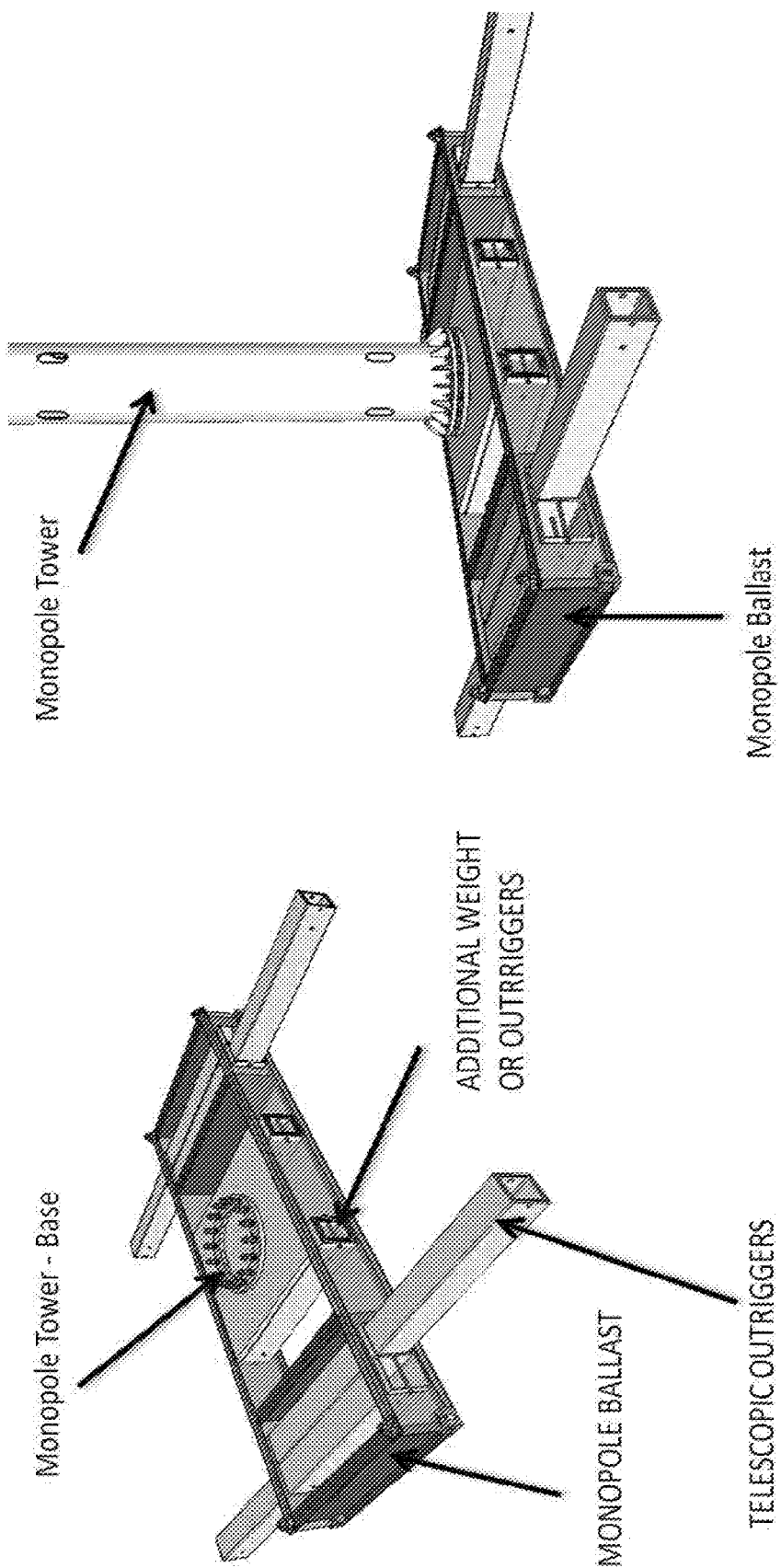

FIG. 21 shows another embodiment of FIG. 20 where a tower base is positioned in the ballast to receive an antenna tower such as a monopole tower. As shown, the tower base is centrally positioned in the ballast, but the base can also be at either end.

Figure 22:
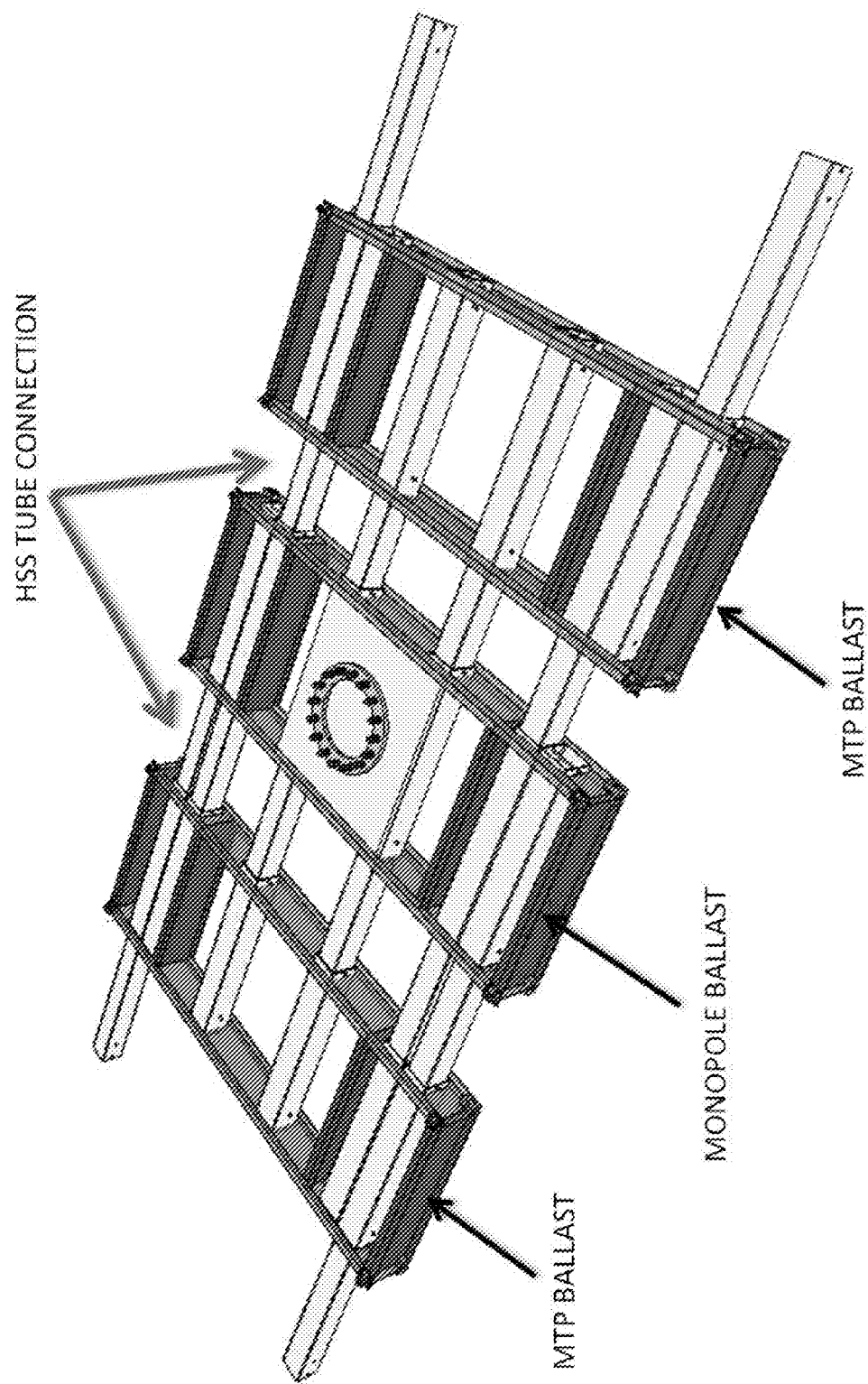
Figure 23:
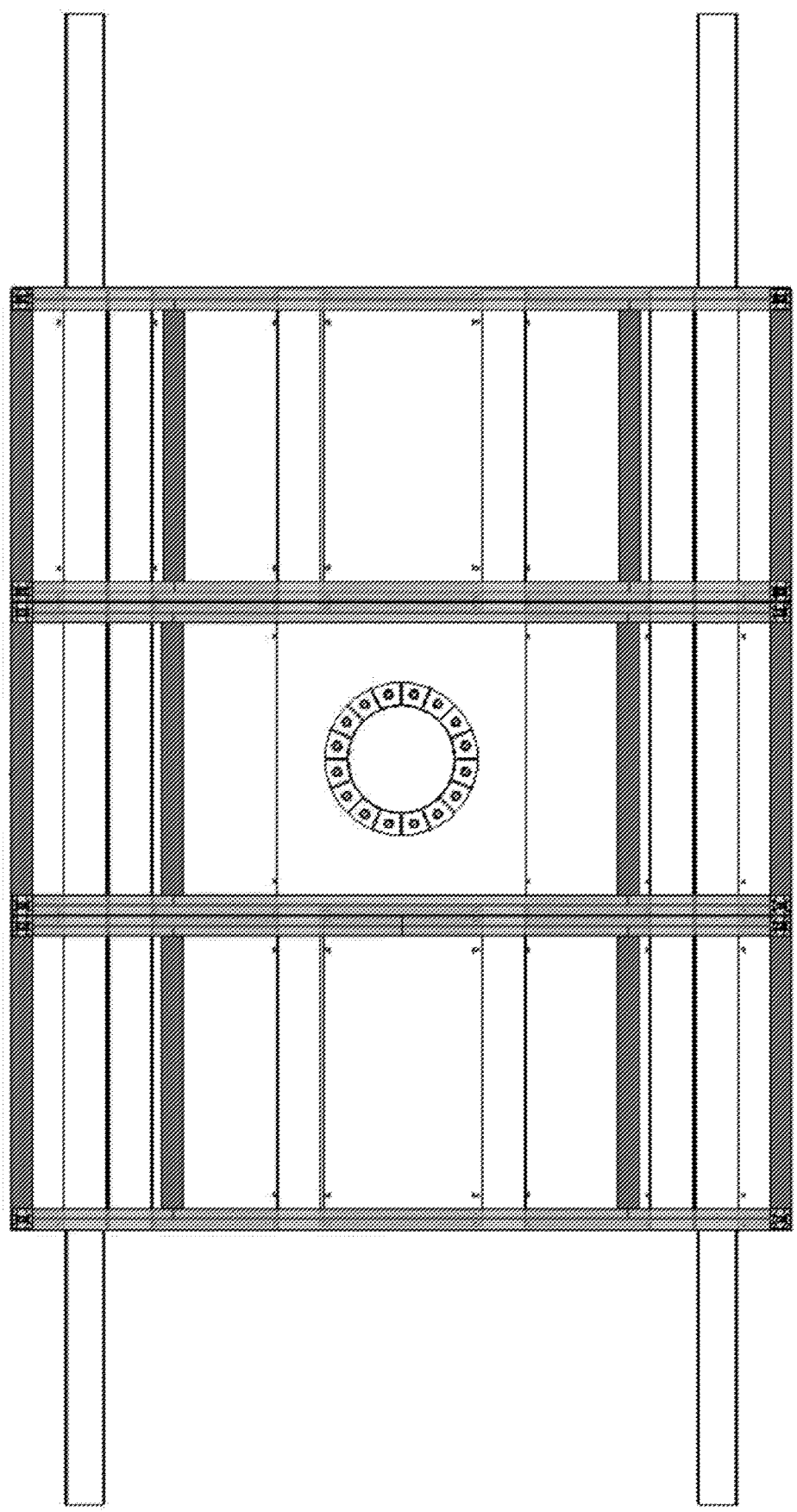

FIG. 22 shows a multi-ballast arrangement, where the outriggers interconnect a plurality of ballasts with tube connections. The ballasts are then secured to each other, with the base at the center as shown in FIG. 23. While FIGS. 22-23 show linkage using outriggers, gusset wires/cables can be used to provide additional securing points for the containers and the ballast. For example, cables can be attached from the tower to the first ballast at a first height, and additional cables can be attached from the tower at a second height to the outriggers.

Figure 24A:
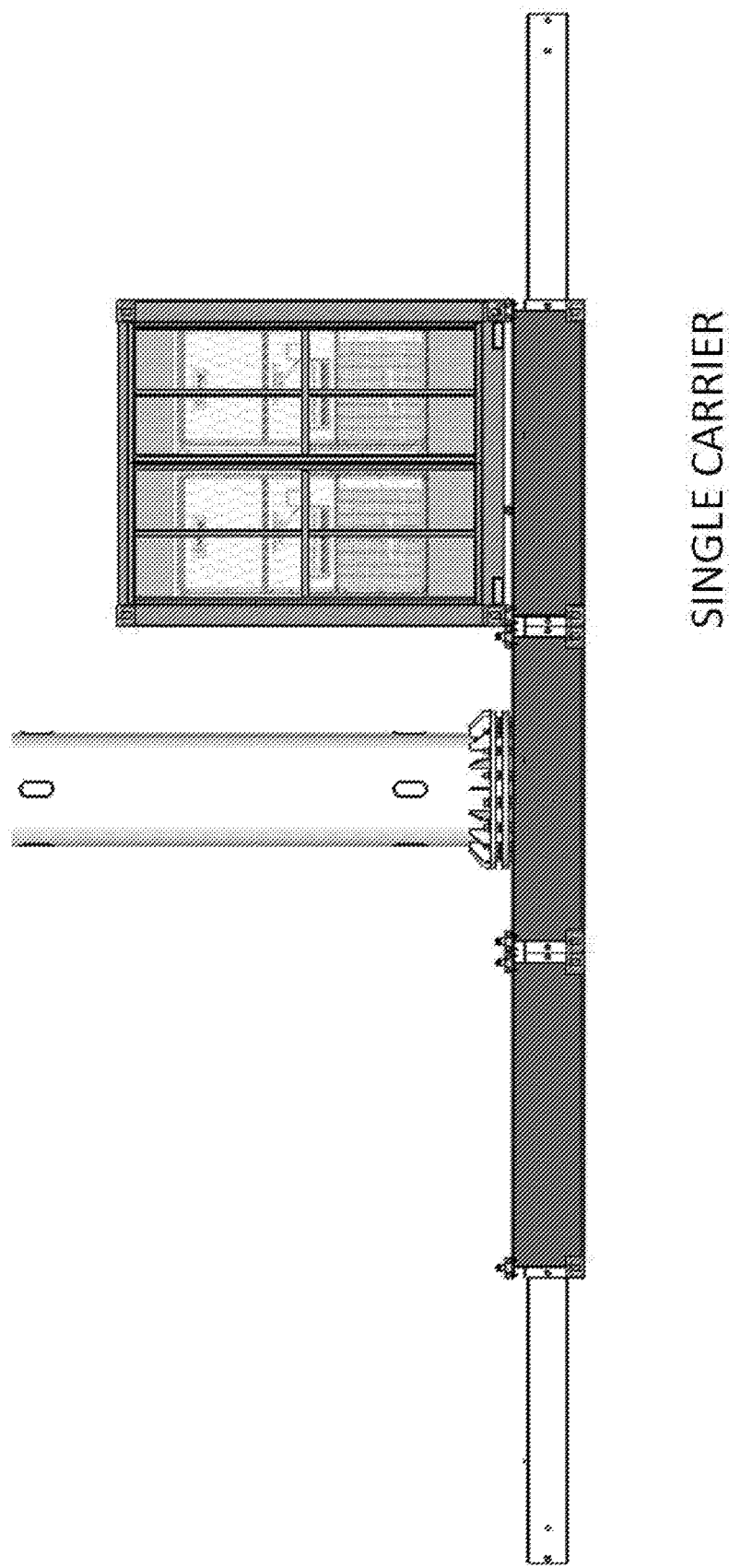
Figure 24B:
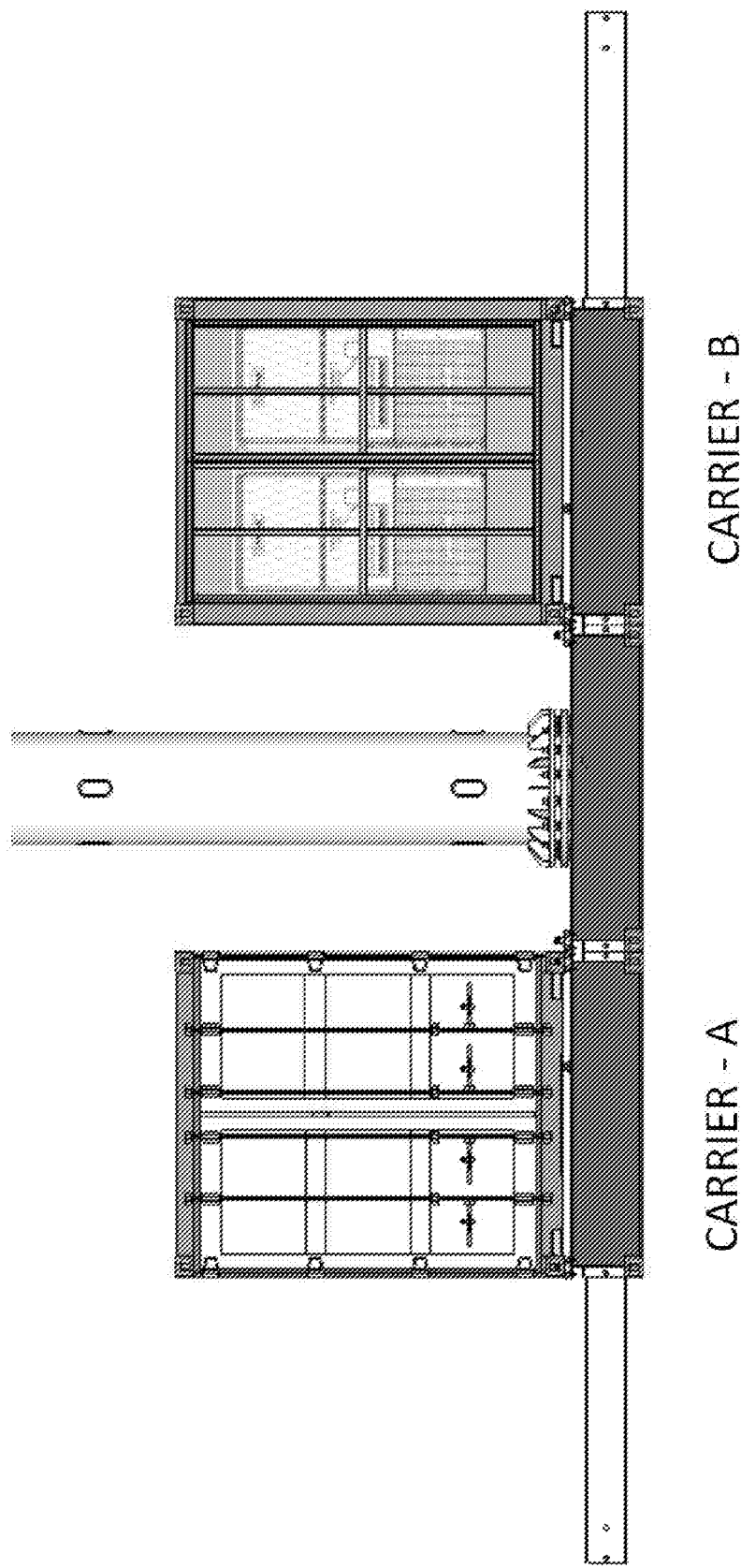

FIGS. 24A shows a single carrier configuration, while FIG. 24B shows a dual carrier configuration. Due to privacy and competitive reasons, each carrier uses its own MTP container with proprietary equipment therein, and the containers connect to antennas that are mounted on the tower secured to the tower base.

Figure 25:
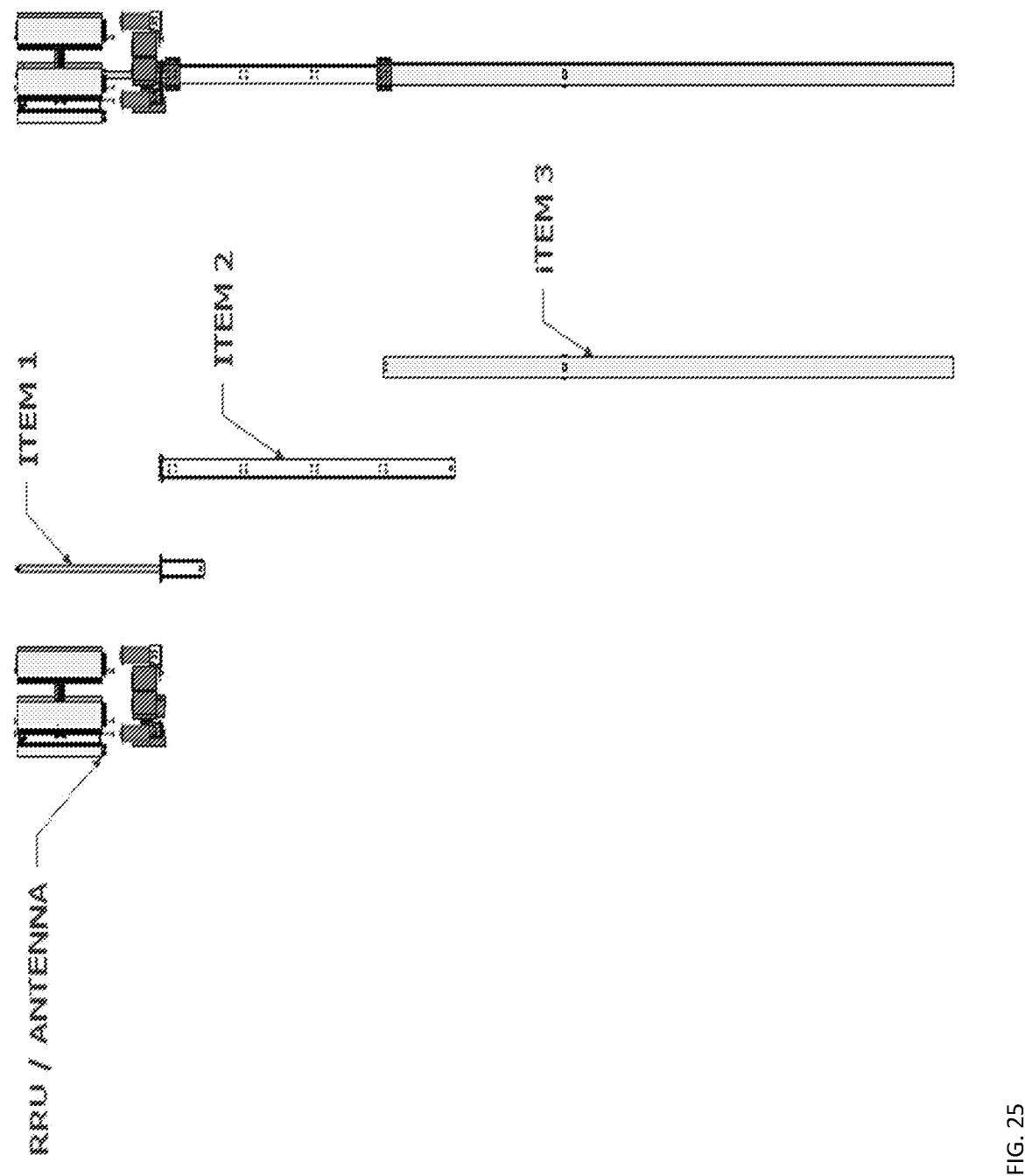
Figure 26:
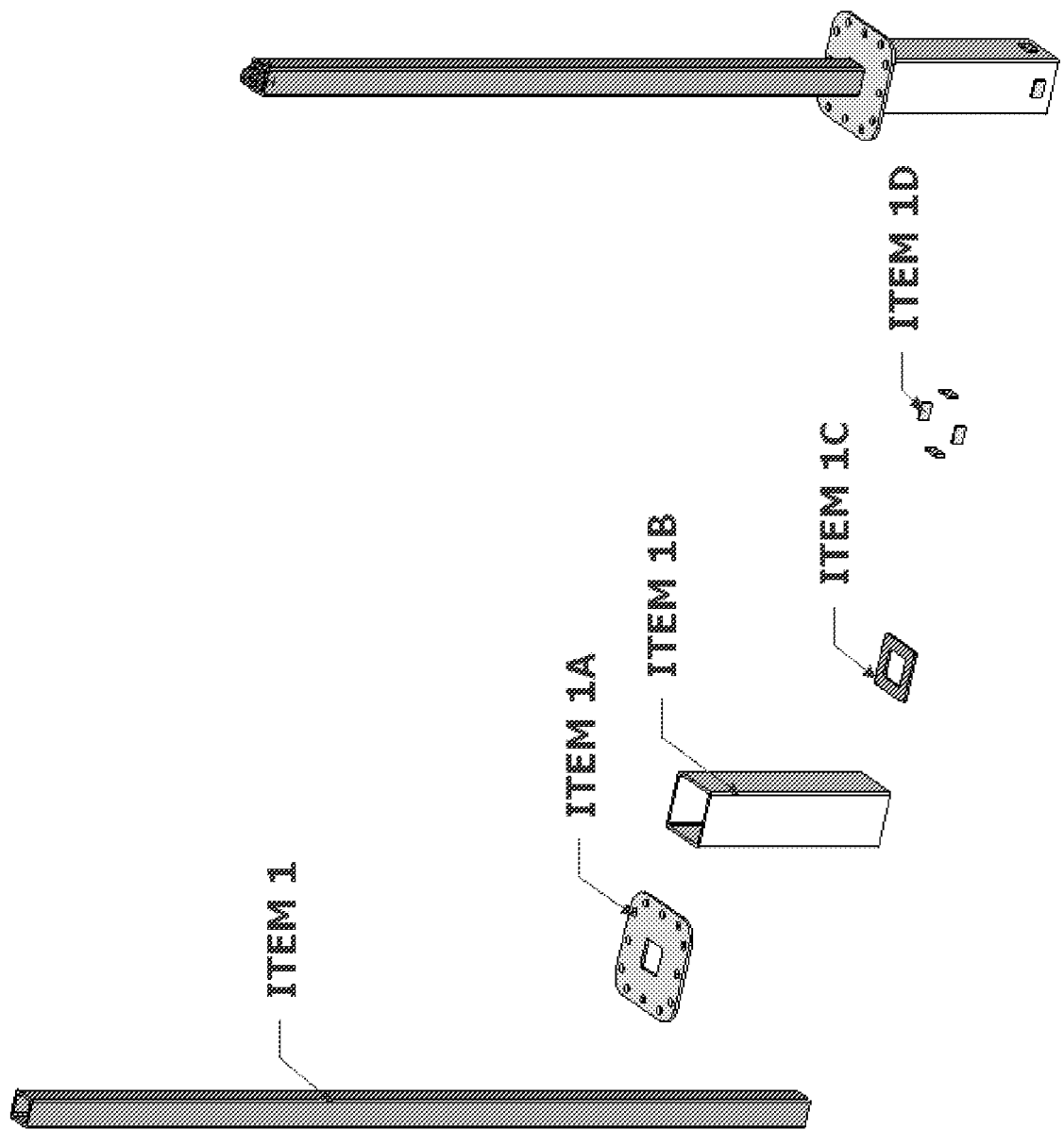

FIGS. 25-28 show more details on an exemplary antenna mast and antenna mount system. In FIG. 25, the last three sections (items 1-3) of the mast enable the mast to reach as high as possible for RF transmission. The radio head and antenna are mounted on the last mast section (item 1). FIG. 26 shows an exemplary mounting of a top hap assembly with a top section and a bottom section. The top section (item 1) is mounted to a base (item 1A) which is connected to a housing (item 1B) with a bottom ring piece (item 1C). Mounting bars (items 1D) secure the bottom piece 1C to the housing item 1B.

Figure 27:
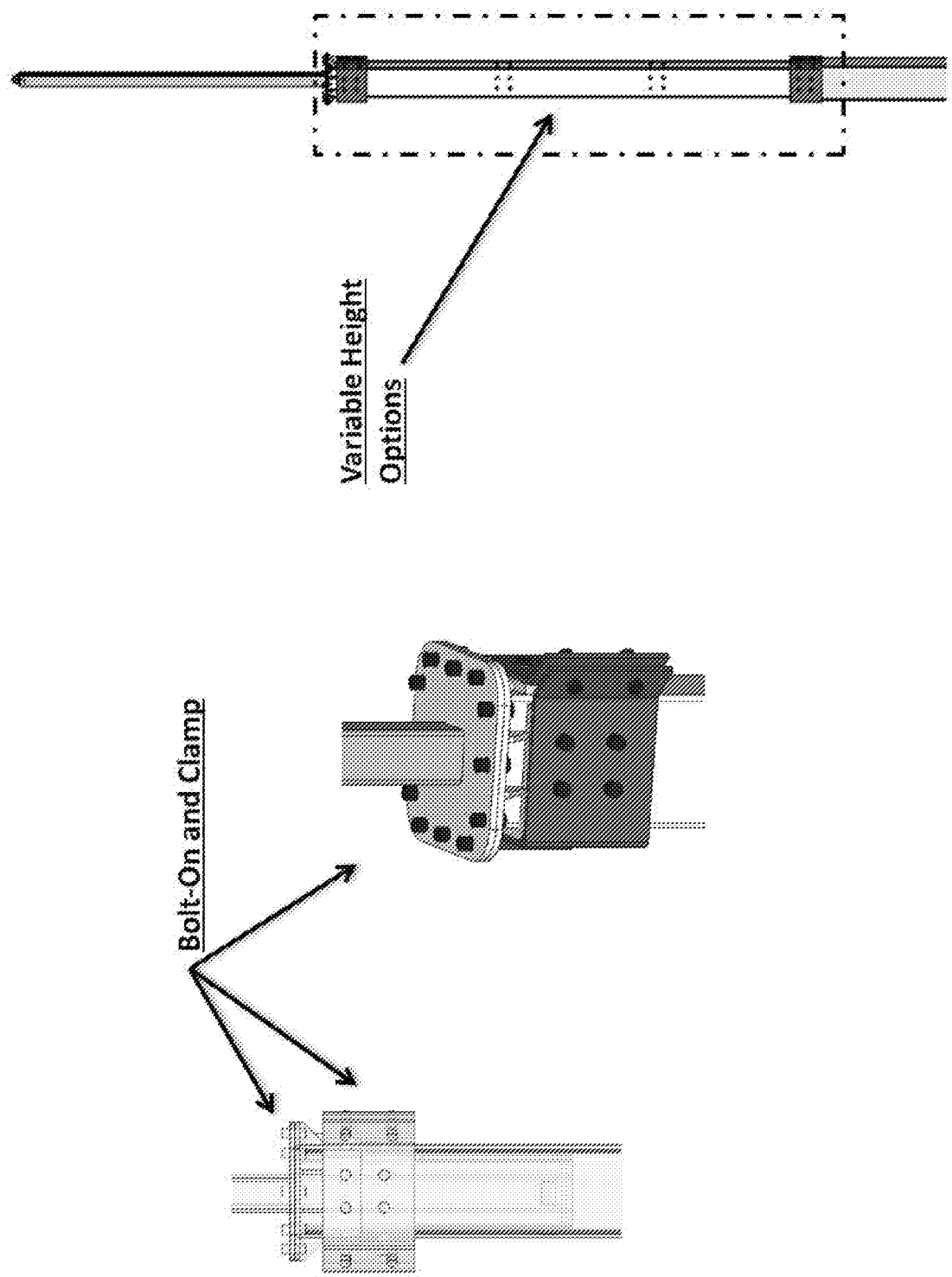

FIG. 27 shows a system to secure the mast sections with bolt-on and clamp. The system has a rectangular clip or strap having an array of openings to receive an array of bolts on each face of the clip/strap. As the antenna mast height is extended, the clip/strap secures the next mast section to the prior mast section to prevent collapse of the pole mast.

Figure 29:
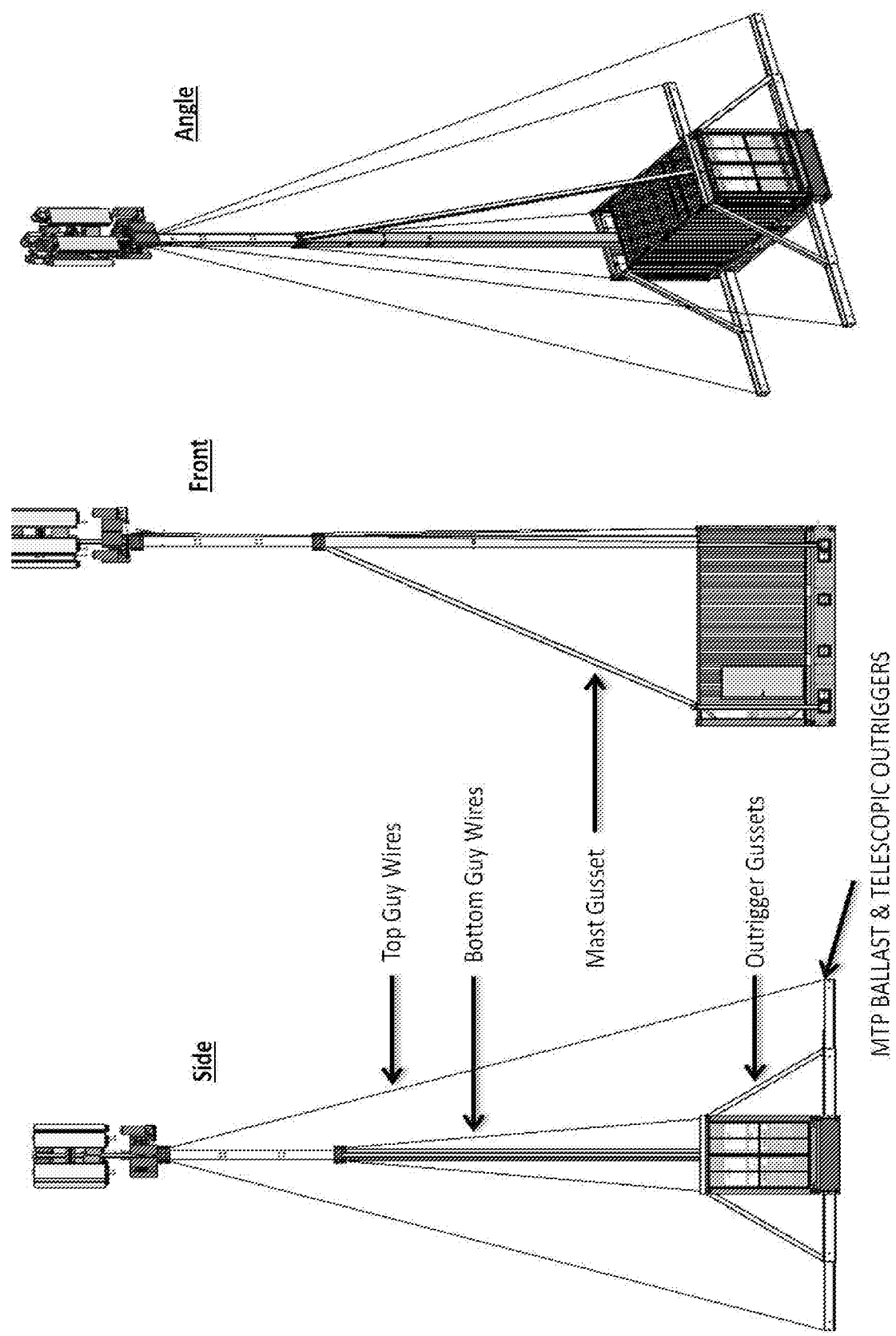
FIG. 29 shows various views of an embodiment where the antenna mast is secured using guy wires and outrigger/mast gussets.

FIG. 28 shows the antenna and electronics mounted on the top mast section. The antenna and electronics can be bolted to the top section, or can be secured by triangular support piece that allows a plurality of antennas to be mounted to the pole segment per support piece. FIG. 29 shows various views of an embodiment where the antenna mast is secured using guy wires and outrigger/mast gussets. In FIG. 29, the top guy wires connect to the outermost outrigger point, and bottom guy wires connect the mast to the top of the container, and a mast gusset secures the mast to the container. Additionally, outrigger gussets secure inner outriggers to the top of the container.

While preferred aspects and example configurations have been shown and described, it is to be understood that various further modifications and additional configurations will be apparent to those skilled in the art. It is intended that the specific embodiments and configurations herein disclosed are illustrative of the preferred nature of the invention, and should not be interpreted as limitations on the scope of the invention. While various embodiments of the invention have been described above, it should be understood that they have been presented by way of example only, and not by way of limitation. Although the disclosure is described above in terms of various exemplary embodiments and implementations, it should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

All references cited herein are incorporated herein by reference in their entirety. To the extent publications and patents or patent applications incorporated by reference contradict the disclosure contained in the specification, the specification is intended to supersede or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term" "including' should be read to mean "including, without limitation,' "including but not limited to,' or the like; the term "comprising" as used herein is synonymous with "including," "containing," or "characterized by," and is inclusive or open-ended and does not exclude additional, unlisted elements or method steps; the term "having" should be interpreted as "having at least;" the term "includes' should be interpreted as "includes but is not limited to;" the term "example" is used to provide exemplary instances of the item in discussion, not an exhaustive or limiting list thereof; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise.

With respect to the use of substantially any plural or singular terms herein, those having skill in the art can translate from the plural to the singular or from the singular to the plural as is appropriate to the context or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of providing mobile cellular pods according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A ballast system, comprising:
   a frame having first and second sides, each having:
      first and second openings to accept first and second outriggers extending therefrom; and
      third and fourth openings to secure to an antenna tower base or one or more supplemental outriggers;
   a plurality of movable antenna sections adapted to fit inside of a base section, each movable antenna section including an outside section and an inside section, wherein the outside section has a plurality of threaded section locks penetrating through threads to extend at least 0.5 inch beyond the inside section to prevent the inside section from collapsing into the outside section in an extended mode; and
   a lock pin to receive an actuator to extend the antenna section.

2. The system of claim 1, comprising:
   a substantially rectangular base with approximate bottom dimensions of a standard International Organization for Standardization (ISO) freight container;
   base locking units at each corner of the base to be secured to a shelter with approximate dimensions of a standard International Organization for Standardization (ISO) freight container.

3. The system of claim 1, wherein the frames are secured together with tongue and groove structures on the sides of the frames.

4. The system of claim 1, comprising concrete reinforcement structures in each frame.

5. The system of claim 1, comprising cable runways in the frame.

6. The system of claim 1, comprising an antenna mount with bolts to secure an extendable mast thereon.

7. The system of claim 6, comprising an actuator to elevate an antenna mast.

8. The system of claim 1, comprising a plurality of radio frequency entry openings to receive cables to an antenna.

9. The system of claim 1, comprising corner posts disposed at each frame corner to secure the frames.

10. The system of claim 1, wherein the shelter is configured to satisfy a stacking test requirement when at least eight similarly dimensioned shelter are stacked on top of a shelter.

11. The system of claim 1, wherein the lock pin is centrally positioned between the antenna sections.

12. The system of claim 11, wherein comprising an elastic sheet between the inside and outside section.

13. The system of claim 11, wherein the inside section comprises one or more bolts extending through the inside section and contacting the outside section.

14. The system of claim 1, comprising a first section extending the antenna system to a height of 87⅜", a second section extending the antenna system to a height of 164", a third section extending the antenna system to a height of 244⅝", a fourth section extending the antenna system to a height of 317¾", a fifth section extending the antenna system to a height of 415", a sixth section extending the antenna system to a height of 505½", a seventh section extending the antenna system to a height of 599¾", an eighth section extending the antenna system to a height of 697½", and a ninth section extending the antenna system to a height of 716¾" in height.

15. The system of claim 1, wherein the antenna sections collapsed to a minimum height of 112½".

16. The system of claim 1, wherein the twist lock is spring loaded.

17. The system of claim 16, comprising one or more bolts to secure the twist lock to the outside section.

18. The system of claim 1, comprising additional ballasts with additional outriggers extending therefrom, wherein the additional outriggers cross-link all ballasts.

19. The system of claim 18, comprising a first cable securing a tower to a ballast, and a second cable securing the tower to an outermost outrigger.

20. The system of claim 1, comprising a first cable securing a tower to a ballast, and a second cable securing the tower to at least one outrigger.

* * * * *